United States Patent
Yamagishi et al.

(10) Patent No.: US 10,750,243 B2
(45) Date of Patent: Aug. 18, 2020

(54) DISTRIBUTION DEVICE, DISTRIBUTION METHOD, RECEPTION DEVICE, RECEPTION METHOD, PROGRAM, AND CONTENT DISTRIBUTION SYSTEM

(71) Applicant: SONY CORPORATION, Tokyo (JP)

(72) Inventors: Yasuaki Yamagishi, Kanagawa (JP); Kazuhiko Takabayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/328,542

(22) PCT Filed: Aug. 17, 2017

(86) PCT No.: PCT/JP2017/029488
§ 371 (c)(1),
(2) Date: Feb. 26, 2019

(87) PCT Pub. No.: WO2018/043134
PCT Pub. Date: Mar. 8, 2018

(65) Prior Publication Data
US 2019/0182550 A1 Jun. 13, 2019

(30) Foreign Application Priority Data
Aug. 30, 2016 (JP) .................................. 2016-167607

(51) Int. Cl.
*H04N 21/4728* (2011.01)
*H04N 21/6587* (2011.01)
(Continued)

(52) U.S. Cl.
CPC ........ *H04N 21/4728* (2013.01); *H04H 20/24* (2013.01); *H04H 20/28* (2013.01);
(Continued)

(58) Field of Classification Search
None
See application file for complete search history.

(56) References Cited

U.S. PATENT DOCUMENTS

2016/0165276 A1 6/2016 Toma et al.
2016/0255412 A1 9/2016 Watanabe et al.
(Continued)

FOREIGN PATENT DOCUMENTS

JP 2015-50769 A 3/2015
JP 2016-9925 A 1/2016
(Continued)

OTHER PUBLICATIONS

International Search Report dated Nov. 21, 2017 in PCT/JP2017/029488 filed Aug. 17, 2017.
(Continued)

*Primary Examiner* — James R Marandi
(74) *Attorney, Agent, or Firm* — Oblon, McClelland, Maier & Neustadt, L.L.P.

(57) ABSTRACT

A distribution device includes a segment filing unit configured to make a video stream of each of areas obtained by imaging an imaging range divided into plural of the areas into a segment file, a distribution unit configured to supply the segment file of the video stream of each of the areas to a reception side by at least one of net distribution or broadcast distribution, and a notification unit configured to notify, in a case an ROI including one or more of the areas is set to the imaging range, the reception side of an ROI identifier for identifying the belonging ROI as attribute information related to the segment file corresponding to the area included in the ROI. The device can be applied to
(Continued)

streaming distribution using DASH and enables signaling of an ROI identifier of a video distributed by at least one of broadcast distribution or net distribution.

8 Claims, 35 Drawing Sheets

(51) Int. Cl.
*H04N 21/2343* (2011.01)
*H04N 21/262* (2011.01)
*H04N 21/845* (2011.01)
*H04H 20/28* (2008.01)
*H04H 20/93* (2008.01)
*H04N 21/218* (2011.01)
*H04H 20/24* (2008.01)
*H04N 21/462* (2011.01)
*H04H 20/42* (2008.01)

(52) U.S. Cl.
CPC ...... *H04H 20/93* (2013.01); *H04N 21/21805* (2013.01); *H04N 21/23439* (2013.01); *H04N 21/234345* (2013.01); *H04N 21/26258* (2013.01); *H04N 21/4622* (2013.01); *H04N 21/6587* (2013.01); *H04N 21/8456* (2013.01); *H04H 20/42* (2013.01)

(56) References Cited

U.S. PATENT DOCUMENTS

2016/0360014 A1\* 12/2016 Kwak ................ H04L 65/80
2017/0105034 A1   4/2017 Fujimori

FOREIGN PATENT DOCUMENTS

WO   WO 2015/060349 A1   4/2015
WO   WO 2015/197815 A1   12/2015
WO   WO 2017/134110   \*   8/2017   ......... H04N 21/4728

OTHER PUBLICATIONS

Hirabayashi, M. "Realizing the Uninterrupted Video Distribution in the Existing Web Server", An Exposition on MPEG-DASH, the Next-Generation Standard of Video Distribution, Nikkei Electronics, Mar. 19, 2012, pp. 77-85, (with English translation).

Extended European Search Report dated Jul. 23, 2019 in corresponding European Patent Application No. 17846142.2, 9 pages.

\* cited by examiner

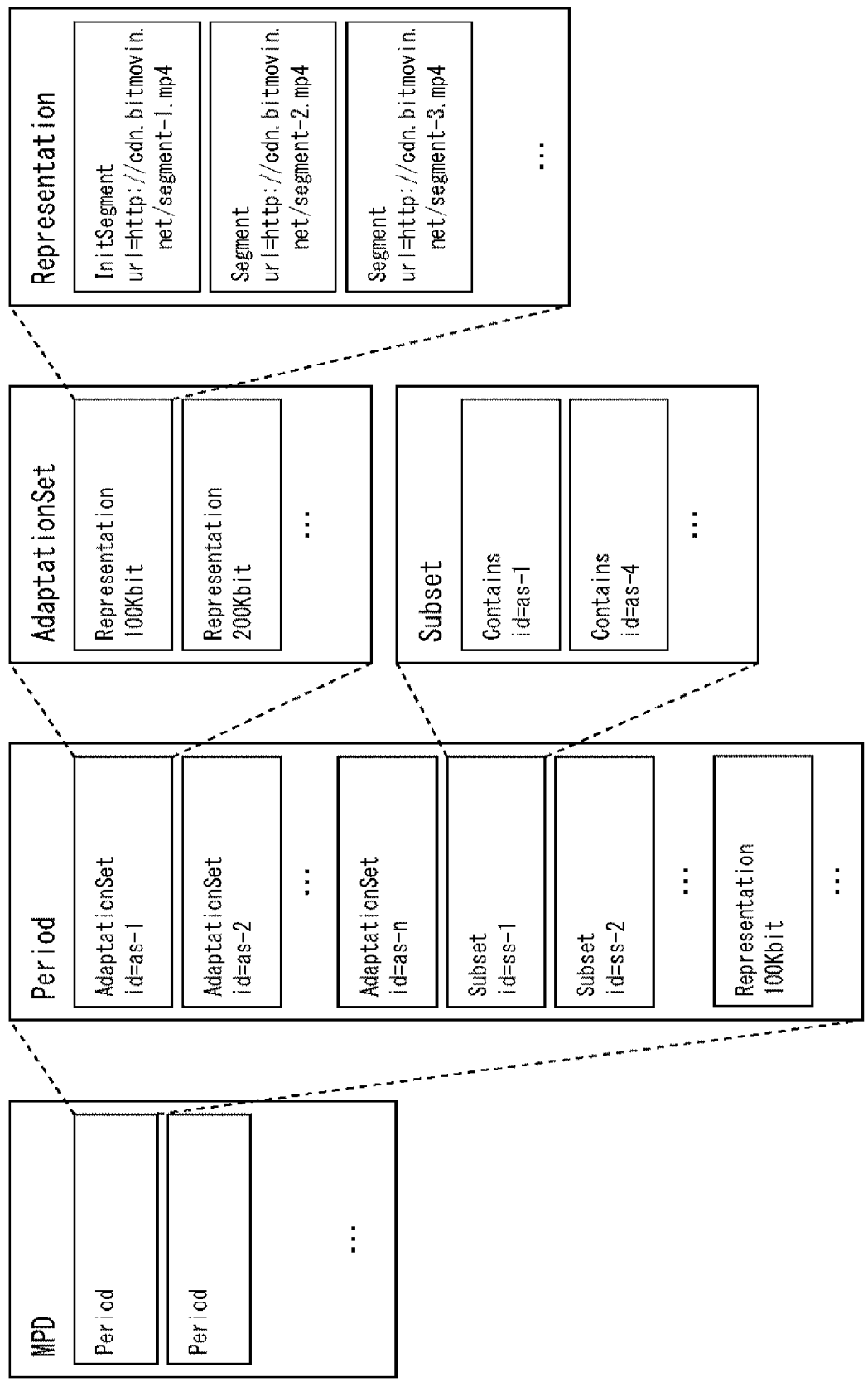

FIG. 3

A
```
<Representation mimeType="video/mp4"
                frameRate="24"
                bandwidth="1558322"
                codecs="avc1.4d401f" width="1277" height="544">
  <BaseURL>http://cdn.bitmovin.net/bbb/video-1500k.mp4</BaseURL>
  <SegmentBase indexRange="0-834"/>
</Representation>
```

B
```
<Representation mimeType="video/mp4"
                frameRate="24"
                bandwidth="1558322"
                codecs="avc1.4d401f" width="1277" height="544">
  <SegmentList duration="10">
    <Initialization sourceURL="http://cdn.bitmovin.net/bbb/video-1500/init.mp4"/>
    <SegmentURL media="http://cdn.bitmovin.net/bbb/video-1500/segment-0.m4s"/>
    <SegmentURL media="http://cdn.bitmovin.net/bbb/video-1500/segment-1.m4s"/>
    <SegmentURL media="http://cdn.bitmovin.net/bbb/video-1500/segment-2.m4s"/>
    <SegmentURL media="http://cdn.bitmovin.net/bbb/video-1500/segment-3.m4s"/>
    <SegmentURL media="http://cdn.bitmovin.net/bbb/video-1500/segment-4.m4s"/>
  </SegmentList>
</Representation>
```

C
```
<Representation mimeType="video/mp4"
                frameRate="24"
                bandwidth="1558322"
                codecs="avc1.4d401f" width="1277" height="544">
  <SegmentTemplate media="http://cdn.bitmovin.net/bbb/video-1500/segment-$Number$.m4s"
                   initialization="http://cdn.bitmovin.net/bbb/video-1500/init.mp4"
                   startNumber="0"
                   timescale="24"
                   duration="48"/>
</Representation>
```

D
```
"http://cdn.bitmovin.net/bbb/video-1500/segment-0.m4s"
"http://cdn.bitmovin.net/bbb/video-1500/segment-1.m4s"
 ...
```

| Parameter | | Type | Cardinality | Description |
|---|---|---|---|---|
| ResourceStatus | | object | 1 | Resource Status Information for resources identified from a base URL. |
| | baseURL | url | 1 | Provides the base URL for the associated resources, i.e. the status holds for all resources referenced by this base URL. baseUrl OF DESCRIPTION TARGET RESOURCE OF THIS MESSAGE |
| | Status | enum | 1 | Provides the status of all associated resource to the base URL. The defined types are documented in Table. STATUS OF RESOURCE SPECIFIED BY baseUrl ABOVE. |
| | Reason | string | 0..1 | Provides some textual information of the reason, e.g. 'you are in broadcast mode'. (<-CURRENT DEFINITION) BROADCAST-DISTRIBUTION SIMULTANEOUSLY USED INFORMATION AND VALUE OF ROI IDENTIFIER IF ROI IDENTIFIER IS ALLOCATED ARE STORED. |

B

| Status | Semantics |
|---|---|
| available | Resource is available in DANE and request is expected to be responded with a 2xx code. AVAILABLE |
| unavailable | Resource is not available in the DANE and request is expected to be responded with a 4xx code. UNAVAILABLE |
| cached | Resource is already cached in the DANE. ALREADY CACHED |

FIG. 10

| | | signaling | NRT | DASH | NRT | Signaling |
|---|---|---|---|---|---|---|
| | Media Processing Unit (MPU) | signaling | | | | |
| | MPU mode payload | | | | | |
| | MPEG Media Transport Protocol (MMTP) | | ROUTE (ALC/LCT) | | HTTP | |
| SLT | | | | | | |
| UDP | UDP | | UDP | | TCP | |
| IP | IP | | IP | | IP | |
| | Data Link Layer (e.g. GSE or TLV or ALP) | | | | Data Link Layer | |
| | Physical Layer (e.g. ATSC 3.0) | | | | Physical Layer | |
| | Broadcast | | | | Broadband | |

FIG. 12

| 511 | 512 | | | | 510 |
|---|---|---|---|---|---|
| 1, 1 | 1, 2 | 1, 3 | 1, 4 | 1, 5 | 1, 6 |
| 2, 1 | 2, 2 | 2, 3 | 2, 4 | 2, 5 | 2, 6 |
| 3, 1 | 3, 2 A | 3, 3 | 3, 4 B | 3, 5 | 3, 6 |
| 4, 1 | 4, 2 | 4, 3 | 4, 4 | 4, 5 | 4, 6 |
| 5, 1 | 5, 2 C | 5, 3 | 5, 4 D | 5, 5 | 5, 6 |
| 6, 1 | 6, 2 | 6, 3 | 6, 4 | 6, 5 | 6, 6 |

FIG. 17

```
<MPD ··· >
...
<Period ···>
 ...
 <AdaptationSet id="1" ···>
  <SupplementalProperty schemeIdUri="urn:mpeg:dash:srd:2014" value="1, 0, 0, 1920, 1080, 1920, 1080, 1"/>
  <Representation id="1" ···>
   <SegmentList ···>
    <SegmentURL media="http://a.com/bb/segment.1.1.mp4" ···/>
    <SegmentURL media="http://a.com/bc/segment.1.1.mp4" ···/>
   </SegmentList>
  </Representation>
 </AdaptationSet>
 <AdaptationSet id="1-1" ···>
  <EssentialProperty schemeIdUri="urn:mpeg:dash:srd:2014" value="1, 0, 0, 1920, 1080, 3840, 2160, 2"/>
  <Representation id="1-1" ···>
   <SegmentList ···>
    <SegmentURL media="http://a.com/bb/segment.1-1.1.mp4" roiId="roiId1" ···/>
    <SegmentURL media="http://a.com/bc/segment.1-1.1.mp4" roiId="roiId1" ···/>
   </SegmentList>
  </Representation >
 </AdaptationSet>
 ...
 ...
 ...
 <AdaptationSet id="1-3" ···>
  <EssentialProperty schemeIdUri="urn:mpeg:dash:srd:2014" value="1, 0, 1080, 1920, 1080, 3840, 2160, 2"/>
  <Representation id="1-3" ···>
   <SegmentList ···>
    <SegmentURL media="http://a.com/bb/segment.1-3.1.mp4" roiId=" roiId2" ···/>
    <SegmentURL media="http://a.com/bc/segment.1-3.1.mp4" roiId=" roiId2" ···/>
   </SegmentList>
  </Representation >
 </AdaptationSet>
 <AdaptationSet id="1-4" ···>
  <EssentialProperty schemeIdUri="urn:mpeg:dash:srd:2014" value="1, 1920, 1080, 1920, 1080, 3840, 2160, 2"/>
  <Representation id="1-4" ···>
   <SegmentList ···>
    <SegmentURL media="http://a.com/bb/segment.1-4.1.mp4" ···/>
    <SegmentURL media="http://a.com/bc/segment.1-4.1.mp4" ···/>
   </SegmentList>
  </Representation >
 </AdaptationSet>
</Period>
</MPD>
```

*FIG. 23*

```
<MPD ··· >
 ···
 <Period ···>
  ···
  <AdaptationSet id="1" ···>
   <SupplementalProperty schemeIdUri="urn:mpeg:dash:srd:2014" value="1, 0, 0, 1920, 1080, 1920, 1080, 1"/>
   <Representation id="1" ···>
    <SegmentTemplate media="http://a.com/bb/segment.1.$Number$.mp4" startNumber="1" ···/>
   </Representation>
  </AdaptationSet>
  <AdaptationSet id="1-1" ···>
   <EssentialProperty schemeIdUri="urn:mpeg:dash:srd:2014" value="1, 0, 0, 1920, 1080, 3840, 2160, 2"/>
   <Representation id="1-1" ···>
    <SegmentTemplate media="http://a.com/bb/segment.1-1.$Number$.mp4" startNumber="1" ···/>
   </Representation >
  </AdaptationSet>
  <AdaptationSet id="1-2" ···>
   <EssentialProperty schemeIdUri="urn:mpeg:dash:srd:2014" value="1, 1920, 0, 1920, 1080, 3840, 2160, 2"/>
   <Representation id="1-2" ···>
    <SegmentTemplate media="http://a.com/bb/segment.1-2.$Number$.mp4" startNumber="1" ···/>
   </Representation >
  </AdaptationSet>
  <AdaptationSet id="1-3" ···>
   <EssentialProperty schemeIdUri="urn:mpeg:dash:srd:2014" value="1, 0, 1080, 1920, 1080, 3840, 2160, 2"/>
   <Representation id="1-3" ···>
    <SegmentTemplate media="http://a.com/bb/segment.1-3.$Number$.mp4" startNumber="1" ···/>
   </Representation >
  </AdaptationSet>
  <AdaptationSet id="1-4" ···>
   <EssentialProperty schemeIdUri="urn:mpeg:dash:srd:2014" value="1, 1920, 1080, 1920, 1080, 3840, 2160, 2"/>
   <Representation id="1-4" ···>
    <SegmentTemplate media="http://a.com/bb/segment.1-4.$Number$.mp4" startNumber="1" ···/>
   </Representation >
  </AdaptationSet>
 </Period>
</MPD>
```

DISTRIBUTION DEVICE, DISTRIBUTION METHOD, RECEPTION DEVICE, RECEPTION METHOD, PROGRAM, AND CONTENT DISTRIBUTION SYSTEM

TECHNICAL FIELD

The present technology relates to a distribution device, a distribution method, a reception device, a reception method, a program, and a content distribution system, and more particularly, to a distribution device, a distribution method, a reception device, a reception method, a program, and a content distribution system suitable for distributing, by broadcast, an image area having a high priority that a possibility of being viewed by a larger number of users is high, for example, and distributing, on demand, other image areas.

BACKGROUND ART

As the standardization movement in internet streaming such as IPTV, standardization of a method applied to video on demand (VoD) streaming by HTTP streaming, live streaming, and the like is being carried out, in particular, dynamic adaptive streaming over HTTP (DASH) standardized by ISO/IEC/MPEG D has attracted attention (for example, see Non-Patent Document 1).

As a use case of DASH, dividing an imaging space into a plurality of rectangular areas, and allocating each of videos in each rectangular area to AdaptationSet of DASH to provide a free viewpoint streaming service is considered.

In a case of realizing the free viewpoint streaming service by combining broadcast distribution and on-demand distribution (hereinafter also referred to as net distribution), if a stream of a video with a high possibility of being commonly viewed by many end users (users of reception devices) is provided by the broadcast distribution, and a stream of a video with a low possibility of being commonly viewed by many users is provided by the net distribution, effective use of distribution resources can be achieved.

Here, the video with a high possibility of being commonly viewed by many users is a video of the entire imaging range, a video or the like of an area (including one or a plurality of adjacent rectangular areas) of ROI (region of interest) designated by a broadcast station or the like. Meanwhile, the video with a low possibility of being commonly viewed by many users and which can be used by specific users is a video in another rectangular area or the like.

According to the free viewpoint streaming service, the user can view only a moving image in an area of interest in the imaging space by designating an arbitrary rectangular area (or a plurality of adjacent rectangular areas).

CITATION LIST

Non-Patent Document

Non-Patent Document 1: "Realizing uninterrupted moving image distribution with existing web server", Mitsuhiro Hirabayashi, NIKKEIELECTRONICS 2012.3.19

SUMMARY OF THE INVENTION

Problems to be Solved by the Invention

By the way, in a case of adopting DASH in ATSC 3.0 that is the next US digital television standard to realize the above-described free viewpoint streaming service, if distribution mode information indicating by which of broadcast distribution and net distribution the video in each rectangular area is distributed, and the ROI identifier (information indicating to which ROI the video belongs) of the video in each rectangular area recognized at the level of broadcast signaling, the recognition can be used as an index of priority to allocate broadcast distribution resources (bandwidths, calculation processing in reception stack, and the like).

However, there is no established method for signaling these ROI identifiers at present.

The present technology has been made in view of such a situation, and is intended to enable signaling ROI identifiers of videos to be distributed by at least one of broadcast distribution or net distribution.

Solutions to Problems

A distribution device according to a first aspect of the present technology includes a segment filing unit configured to make a video stream of each of areas obtained by imaging an imaging range divided into a plurality of the areas into a segment file, a distribution unit configured to supply the segment file of the video stream of each of the areas to a reception side by at least one of net distribution or broadcast distribution, and a notification unit configured to notify, in a case where an ROI including one or more of the areas is set to the imaging range, the reception side of an ROI identifier for identifying the belonging ROI as attribute information related to the segment file corresponding to the area included in the ROI.

The notification unit can further notify the reception side of distribution mode information indicating by which of the net distribution and the broadcast distribution the segment file is distributed as the attribute information related to the segment file.

The notification unit can describe the attribute information related to the segment file in Media Presentation Description (MPD) defined in DASH and notify the reception side of the attribute information.

In a case where SegmentTemplate is used in MPD defined in DASH, the notification unit can describe the attribute information related to the segment file in USD User Service Description (USD) and notify the reception side of the attribute information.

In a case where SegmentTemplate is used in MPD defined in DASH, the notification unit can describe the attribute information related to the segment file in EFDT Extended File Delivery Table (EFDT) and notify the reception side of the attribute information to the reception side.

In a case where SegmentTemplate is used in MPD defined in DASH, the notification unit can describe the attribute information related to the segment file in an entity header and notify the reception side of the attribute information.

One or more of the ROIs can be set to the imaging range.

The distribution unit can distribute all of segment files of the video stream respectively corresponding to the areas by the net distribution, and distribute the segment file corresponding to the area included in the ROI by the broadcast distribution.

A distribution method according to the first aspect of the present technology includes, by the distribution device, a segment filing unit configured to make a video stream of each of areas obtained by imaging an imaging range divided into a plurality of the areas into a segment file, a distribution step of supplying the segment file of the video stream of each of the areas to a reception side by at least one of net distribution or broadcast distribution, and a notification step of notifying, in a case where an ROI including one or more of the areas is set to the imaging range, the reception side of an ROI identifier for identifying the belonging ROI as attribute information related to the segment file corresponding to the area included in the ROI.

A program according to the first aspect of the present technology causes a computer to function as a segment filing unit configured to make a video stream of each of areas obtained by imaging an imaging range divided into a plurality of the areas into a segment file, a distribution unit configured to supply the segment file of the video stream of each of the areas to a reception side by at least one of net distribution or broadcast distribution, and a notification unit configured to notify, in a case where an ROI including one or more of the areas is set to the imaging range, the reception side of an ROI identifier for identifying the belonging ROI as attribute information related to the segment file corresponding to the area included in the ROI.

In the first aspect of the present technology, a video stream of each of areas obtained by imaging an imaging range divided into a plurality of the areas is made into a segment file, the segment file of the video stream of each of the areas is supplied to a reception side by at least one of net distribution or broadcast distribution, and in a case where an ROI including one or more of the areas is set to the imaging range, the reception side is notified of an ROI identifier for identifying the belonging ROI as attribute information related to the segment file corresponding to the area included in the ROI.

A reception device according to a second aspect of the present technology includes an analysis unit configured to acquire and analyze, in a case where a ROI including one or more areas is set to an imaging range divided into a plurality of areas, attribute information related to a segment file of a video stream corresponding to the area included in the ROI and the attribute information including a ROI identifier for identifying the at least belonging ROI, a request unit configured to request the segment file corresponding to a predetermined ROI identifier on the basis of an analysis result of the attribute information, an acquisition unit configured to acquire the requested segment file corresponding to the predetermined ROI identifier by net distribution or broadcast distribution, and a reproduction unit configured to reproduce the acquired segment file.

The request unit can request the segment file corresponding to an ROI identifier specified by an operation from a user.

The request unit can request the segment file corresponding to an ROI identifier specified by an operation to designate an object on a screen.

The request unit can request the segment file corresponding to an ROI identifier specified by an operation to select metadata of an object.

The attribute information can further include distribution mode information indicating by which of the net distribution and the broadcast distribution the segment file is distributed, and the acquisition unit can acquire the requested segment file corresponding to the predetermined ROI identifier by net distribution or broadcast distribution on the basis of the distribution mode information.

The request unit can be notified of the analysis result of the attribute information by the analysis unit using a Server and Network Assisted DASH (SAND) message.

A reception method according to the second aspect of the present technology includes, by the reception device, an analysis step of acquiring and analyzing, in a case where a ROI including one or more areas is set to an imaging range divided into a plurality of areas, attribute information related to a segment file of a video stream corresponding to the area included in the ROI and the attribute information including a ROI identifier for identifying the at least belonging ROI, a request step of requesting the segment file corresponding to a predetermined ROI identifier on the basis of an analysis result of the attribute information, an acquisition step of acquiring the requested segment file corresponding to the predetermined ROI identifier by net distribution or broadcast distribution, and a reproduction step of reproducing the acquired segment file.

A program according to the second aspect of the present technology causes a computer to function as an analysis unit configured to acquire and analyze, in a case where a ROI including one or more areas is set to an imaging range divided into a plurality of areas, attribute information related to a segment file of a video stream corresponding to the area included in the ROI and the attribute information including a ROI identifier for identifying the at least belonging ROI, a request unit configured to request the segment file corresponding to a predetermined ROI identifier on the basis of an analysis result of the attribute information, an acquisition unit configured to acquire the requested segment file corresponding to the predetermined ROI identifier by net distribution or broadcast distribution, and a reproduction unit configured to reproduce the acquired segment file.

In the second aspect of the present technology, attribute information is analyzed, a segment file corresponding to a predetermined ROI identifier is requested on the basis of an analysis result of the attribute information, the requested segment file corresponding to the predetermined ROI identifier is acquired via net distribution or broadcast distribution, and the acquired segment file is reproduced.

A content distribution system according to a third aspect of the present technology includes a distribution device and a reception device. The distribution device includes a segment filing unit configured to make a video stream of each of areas obtained by imaging an imaging range divided into a plurality of the areas into a segment file, a distribution unit configured to supply the segment file of the video stream of each of the areas to a reception side by at least one of net distribution or broadcast distribution, and a notification unit configured to notify, in a case where an ROI including one or more of the areas is set to the imaging range, the reception side of an ROI identifier for identifying the belonging ROI as attribute information related to the segment file corresponding to the area included in the ROI. Furthermore, the reception device includes an analysis unit configured to analyze the attribute information given in notification from the distribution device, a request unit configured to request the segment file corresponding to a predetermined ROI identifier on the basis of an analysis result of the attribute information, an acquisition unit configured to acquire the requested segment file corresponding to the predetermined ROI identifier by net distribution or broadcast distribution, and a reproduction unit configured to reproduce the acquired segment file.

In the third aspect of the present technology, by the distribution device, a video stream of each of areas obtained by imaging an imaging range divided into a plurality of the areas is made into a segment file, the segment file of the video stream of each of the areas is supplied to a reception side by at least one of net distribution or broadcast distribution, and in a case where an ROI including one or more of the areas is set to the imaging range, the reception side is notified of an ROI identifier for identifying the belonging ROI as attribute information related to the segment file corresponding to the area included in the ROI. Furthermore, by the reception device, attribute information given in notification from the distribution device is analyzed, a segment file corresponding to a predetermined ROI identifier is requested on the basis of an analysis result of the attribute information, the requested segment file corresponding to the predetermined ROI identifier is acquired via net distribution or broadcast distribution, and the acquired segment file is reproduced.

Effects of the Invention

According to the first aspect of the present technology, the ROI identifier of the video distributed by at least one of the broadcast distribution or the net distribution can be signaled.

According to the second aspect of the present technology, the segment file of the area belonging to the specific ROI can be acquired and reproduced.

According to the third aspect of the present technology, the ROI identifier of the video distributed by at least one of the broadcast distribution or the net distribution can be signaled, the segment file of the area belonging to the specific ROI can be reproduced on the reception side.

BRIEF DESCRIPTION OF DRAWINGS

FIG. 2 is a diagram illustrating a data structure of MPD.

FIG. 3 is a diagram illustrating an example of representation.

FIG. 9 is a diagram for describing elements of ResourceStatus.

FIG. 10 is a diagram illustrating stack based on ROUTE/DASH.

FIG. 12 is a diagram illustrating a relationship among an entire imaging space, rectangular areas, and areas.

FIG. 17 is a diagram illustrating MPD-SRD expression corresponding to FIG. 16.

FIG. 23 is a diagram illustrating MPD-SRD expression rewritten using SegmentTemplate.

MODE FOR CARRYING OUT THE INVENTION

Hereinafter, best modes for implementing the present technology (hereinafter referred to as embodiments) will be described in detail with reference to the drawings. Note that the description will be given in the following order.

1. <Configuration Example of Content Distribution System Adopting DASH>
2. <Configuration Example of Client Device to Which Present Technology is Applied>
3. <PER Message>
4. <Case of Storing Distribution Mode Information and ROI Identifier in MPD>
5. <Handling of Case of Using SegmentTemplate for MPD>
6. <Case of Storing Distribution Mode Information and ROI Identifier in USD>
7. <Extension of EFDT>
8. <Extension of Entity Header>
9. <Examples of Use of ROI Identifier in Client Device>
<Outline Description of DASH>

Figure 1:
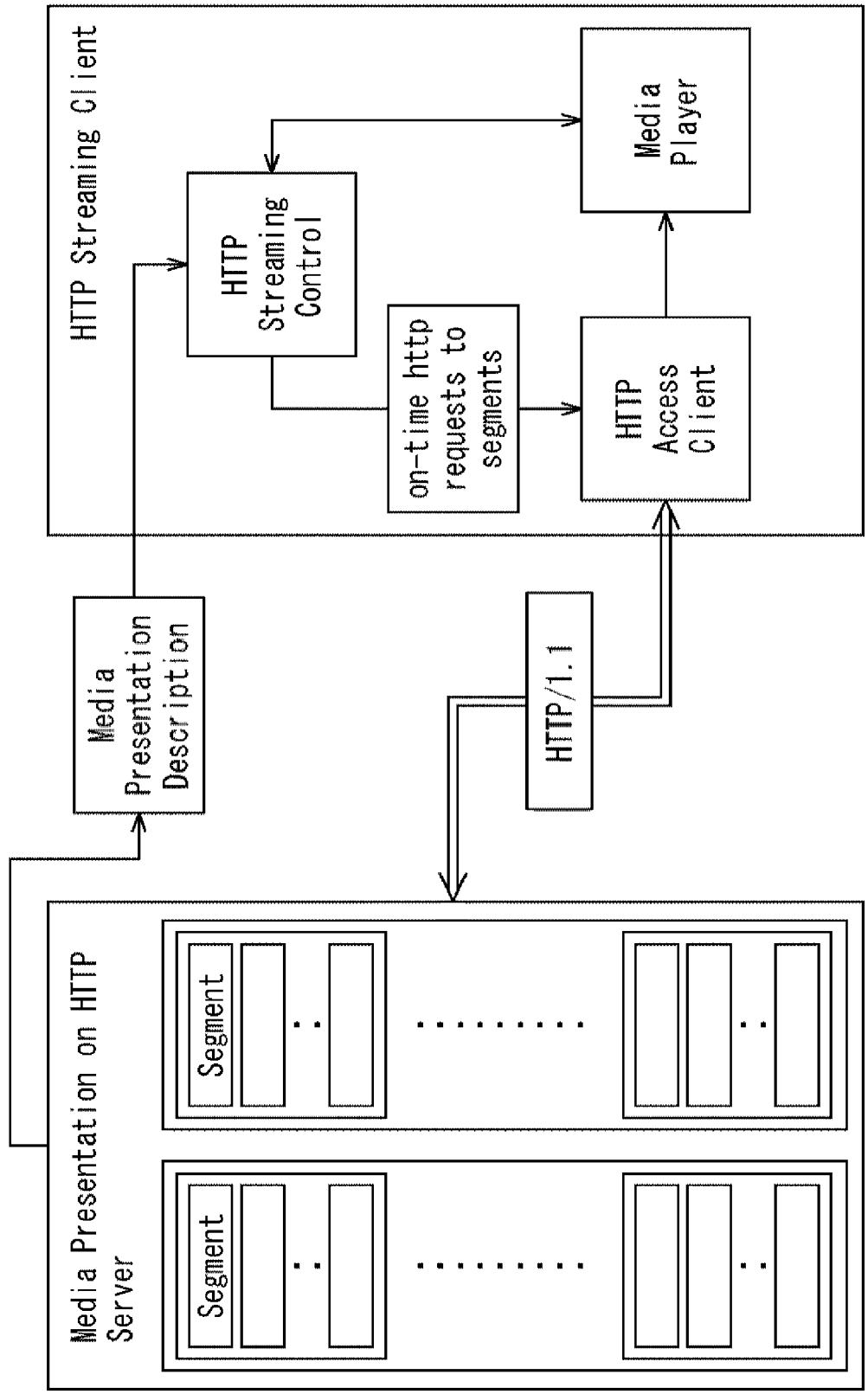
FIG. 1 is a block diagram illustrating a configuration example of a content distribution system.

First, an outline of DASH will be described. FIG. 1 illustrates a configuration example of a content distribution system adopting DASH. A media presentation on HTTP server illustrated on the left side in FIG. 1 is a content delivery side, and an HTTP streaming client illustrated on the right side in FIG. 1 is a content reception side and receives and reproduces a received stream of content and present the content to a user.

The media presentation on HTTP server on the distribution side can prepare and supply a plurality of streams that is of content of the same contents and in which image quality, angle of view sizes, and the like are changed according to a communication environment of a broadcast network such as terrestrial digital broadcast or satellite broadcast, a bidirectional communication network such as the Internet, and a mobile phone communication network such as 3GPP or LTE-eMBMS, which becomes a pass, and an ability and a state of the reception side.

Furthermore, the media presentation on HTTP server can prepare and supply a plurality of streams of a video of the entire imaging area of the same content or of videos of a plurality of rectangular areas obtained by dividing the imaging area, in other words, videos belonging to the same content but contents are different, in which the image quality, the angle of view sizes, and the like are changed according to the communication environment of the path, and the ability and the state of the reception side.

Meanwhile, the HTTP streaming client on the reception side can select, acquire, and reproduce an optimum stream according to the communication environment of the path, and the ability, the state, or the like of the reception side, of the plurality of streams prepared by the distribution side.

In this way, in DASH, metadata called media presentation description (MPD) is supplied from the distribution side of the content to the reception side so that the reception side can adaptively select and obtain the stream.

In the MPD, an address (url information) of a chunked stream (media data such as audio/video/subtitle) is described. The reception side can access a predetermined server that is a supply source of the content and can acquire and reproduce HTTP-distributed streaming data on the basis of the url information.

Note that it may happen that an overwhelmingly larger number of the HTTP streaming clients on the reception side than the distribution side requests the same server that is the supply source of the content to supply the same stream. In such a case, the communication efficiency is poor if the same stream is transmitted each time in accordance with the supply from each HTTP streaming client. Therefore, in some cases, a so-called proxy server is provided on the Internet or the like.

FIG. 2 illustrates a data structure of MPD as metadata to be supplied from a distribution side of content to a reception side.

In the MPD, information regarding content is divided for each period. In each period, AdaptationSet for grouping a plurality of representations including information regarding synchronized streaming data having the same contents and having different stream attributes such as a bit rate, in which image quality, angle of view size, language, and the like are changed. In the representation, information regarding a segment obtained by further temporally dividing period is stored.

Note that the period is a unit of temporal break of content. The segment is a unit of temporally subdivided period, and the stream of the content is filed into a segment file in units of segments.

Each segment file is specified by a URL (+byte range). The segment is a part of the representation, and one representation is configured by one of the following:
(1) one or more SegmentLists
(2) one SegmentTemplate
(3) one or more BaseURLs and up to one SegmentBase (not including SegmentList and SegmentTemplate in this case)

FIG. 3 illustrates an example of the representation corresponding to (1) to (3) above.

The SegmentBase in the above (3) is used in a case where there is only one media segment in one representation, as illustrated in FIG. 3A. In this case, a byte string of initialization information and a byte string of random access points (RAP) are contained within first 834 bytes (described by indexRange of the SegmentBase) of a file.

The SegmentList in the above (1) is configured by a plurality of SegmentURLs arranged in a reproduction order, as illustrated in FIG. 3B. The SegmentURL is expressed by a URL of the segment file (+a byte range in the file). Initialization arranged in the beginning of SegmentList gives an instruction on the file (InitSegment) where the initialization information is arranged.

The SegmentTemplate in the above (2) is used when SegmentURL is automatically generated on the basis of the SegmentTemplate (typical use case is live streaming). In other words, the reception side dynamically replaces predetermined parameters included in a template of the SegmentURL described in the SegmentTemplate. By using SegmentTemplate, the size of the MPD can be made very small.

For example, in a case where the SegmentTemplate as illustrated in FIG. 3C is used, $Number$, which is ReplacementParameter, is replaced with a value incremented by 1 with a value indicated by StartNumber as an initial value, whereby the SegmentURL as illustrated in FIG. 3D is generated.

Figure 4:
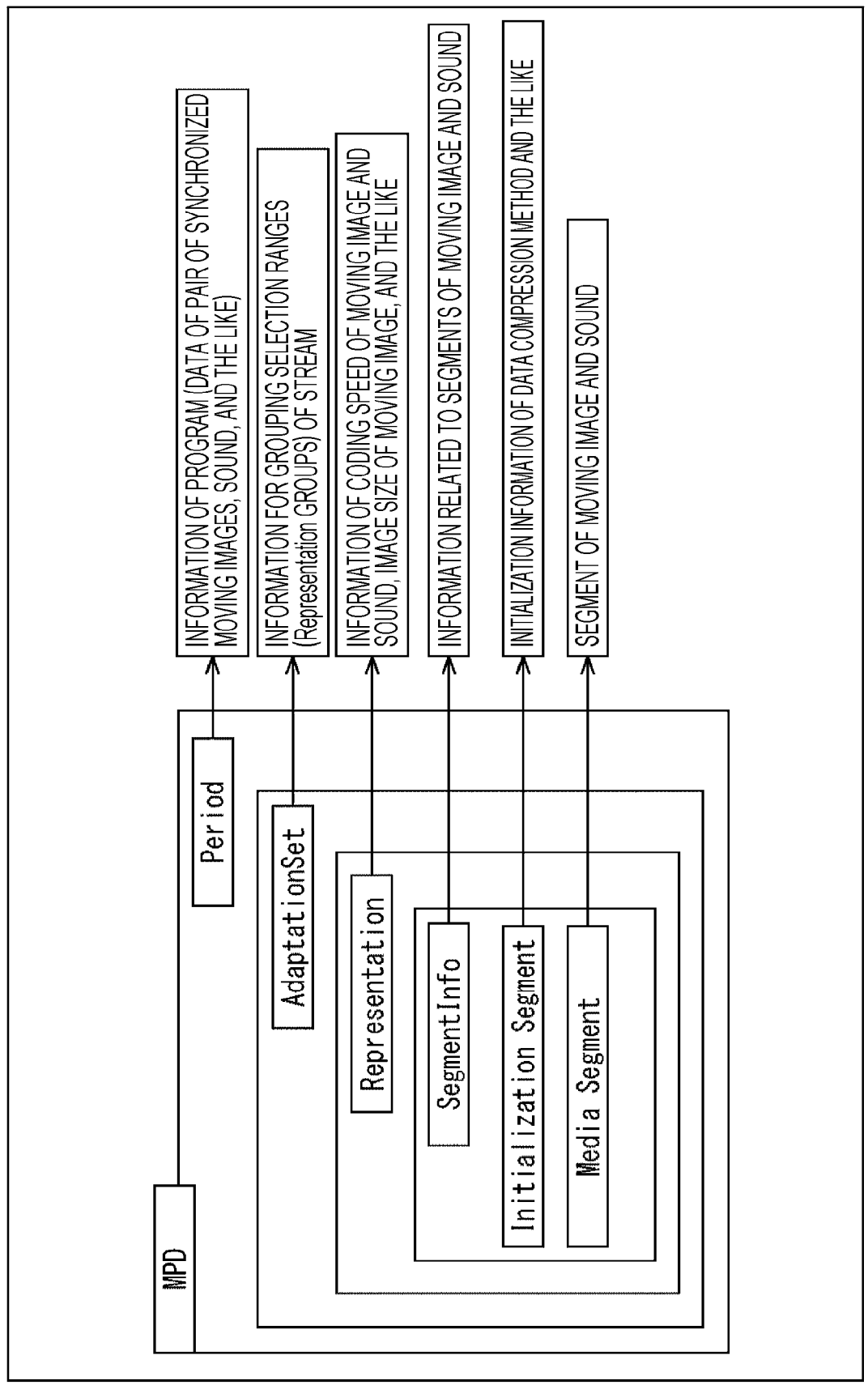
FIG. 4 is a diagram illustrating a hierarchical structure of a period and lower layers in the MPD.

FIG. 4 illustrates a hierarchical structure of the period and lower layers in the MPD. Note that the MPD is described in, for example, an XML format. In a lower layer of the period, AdaptationSet that is information for grouping representation groups that are selection ranges of a stream is described. In a lower layer of the AdaptationSet, representation including information indicating a bit rate, an angle of view size, a language, and the like of a moving image and sound is described. In a lower layer of the representation, segmentinfo that is information related to the segment of the moving images and sound is described. In a lower layer of the segmentinfo, initialization segment indicating initialization information such as a data compression method, and media segment indicating a supply source of data in units of segments of the moving image and sound are described.

The reception side selects Reproduction optimum for reception and reproduction on the basis of an attribute of representation included in the period of the MPD, acquires initialization segment from a head segment of the selected representation and determines a data compression method and the like, then can request, acquire, and reproduce following segments.

Figure 5:
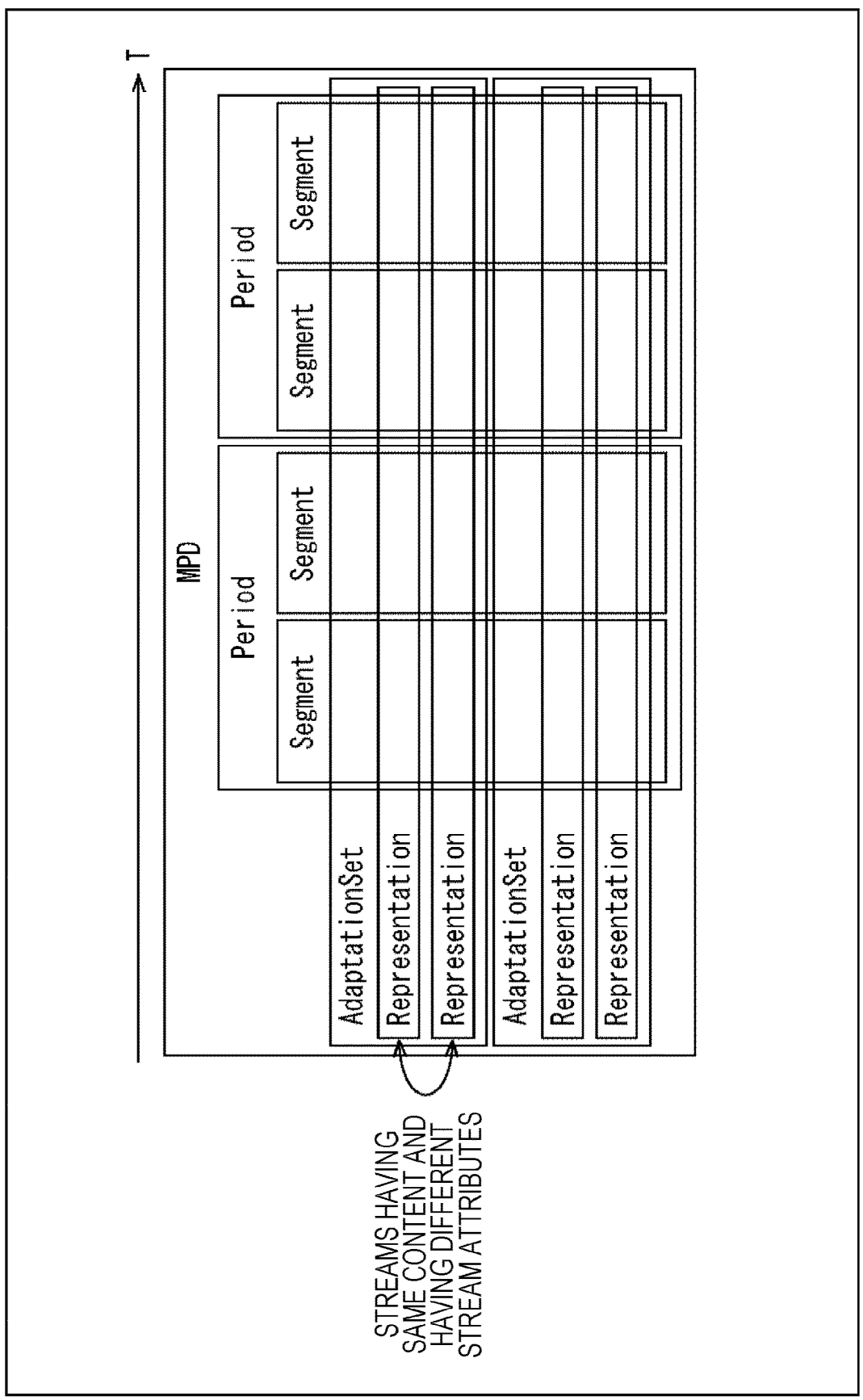
FIG. 5 is a diagram illustrating a state in which the structure of the MPD is arranged on a time axis.

FIG. 5 illustrates a state in which the structure of the MPD is arranged on a time axis. As is clear from FIG. 5, segments of representations having different stream attributes included in the same AdaptationSet are synchronized.

As described above, the video of the entire imaging area of the same content and the video stream of each rectangular area obtained by dividing the imaging area into a plurality of parts belong to different AdaptationSets. However, even in that case, the segments of the representations included in the different AdaptationSets are synchronized.

Figure 6:
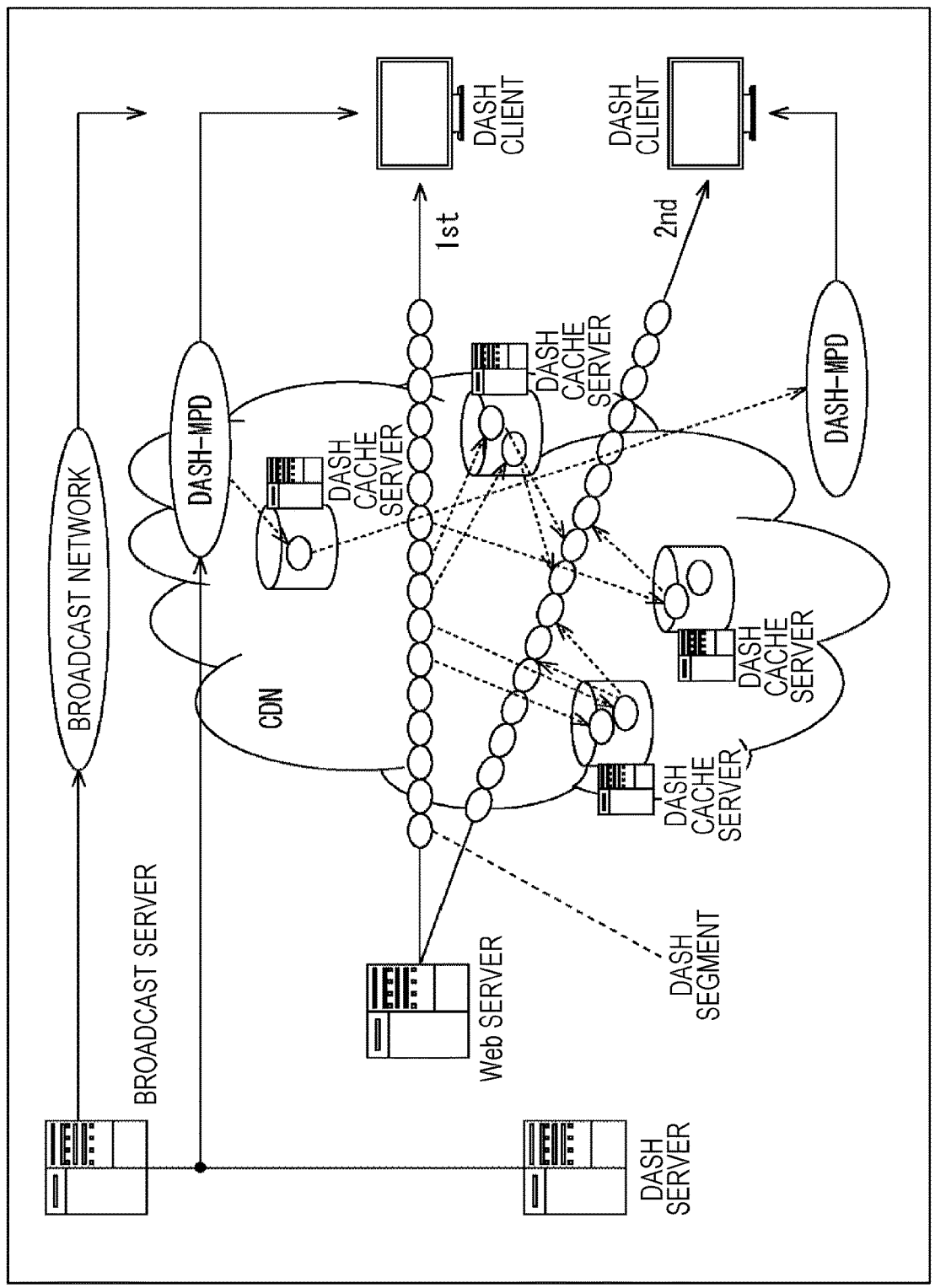
FIG. 6 is a block diagram illustrating a more detailed configuration example of the content distribution system.

Next, FIG. 6 illustrates a more detailed configuration example of the content distribution system adopting DASH.

A DASH server, a web server, and a broadcast server in FIG. 6 correspond to the media presentation on HTTP server in FIG. 1. Furthermore, a DASH client in FIG. 6 corresponds to the HTTP streaming client in FIG. 1.

The DASH client can access the DASH server and the web server via content delivery network (CDN) formed on the Internet. The CDN is provided with a DASH cache server (proxy server).

The DASH server generates MPD and transfers the MPD to the broadcast server, and generates a segment file of a stream and transfers the segment file to the web server. Furthermore, the DASH server distributes, by net distribution, the generated MPD via content delivery network (CDN) in response to an HTTP request from the DASH client. The web server distributes, by net distribution, the segment file via the CDN in response to an HTTP request from the DASH client that has selected an acquisition source of a stream by reference to the MPD. The broadcast server distributes the MPD by broadcast distribution. Furthermore, the broadcast server distributes the segment file by broadcast distribution.

The DASH cache server monitors the CDN and temporarily caches the segment file distributed to the DASH client via the CDN. Then, in a case where an HTTP request requesting the cached segment file is transmitted from the DASH client to the web server, the DASH cache server distributes the cached segment file to the MPD client as a request source on behalf of the web server.

Note that the DASH cache server can temporarily cache not only the segment file of the stream but also the MPD, and can supply the cached MPD to the DASH client as the request source on behalf of the DASH server. Furthermore, the DASH cache server may be able to receive and cache the MPD and the segment file distributed by broadcast distribution.

By providing the DASH cache server on the CDN, the content distribution system can improve the distribution efficiency of HTTP streaming to the majority of DASH clients.

<Configuration Example of Client Device to which Present Technology is Applied>

Figure 7:
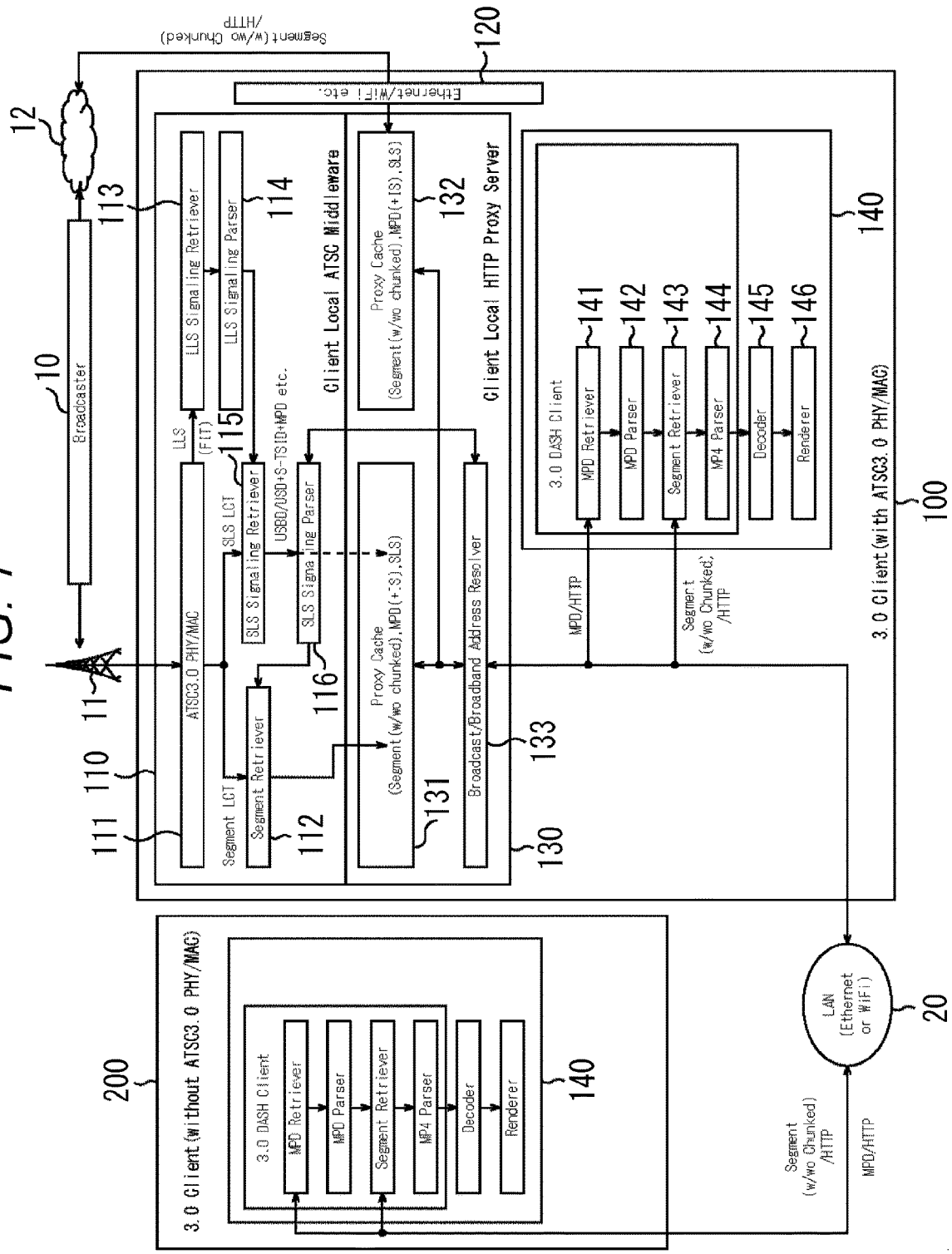
FIG. 7 is a block diagram illustrating a configuration example of a client device to which the present technology is applied.

Next, FIG. 7 illustrates a configuration example of a client device on the reception side in the case of adopting DASH in ATSC 3.0 and realizing a free viewpoint streaming service.

A client device 100 can also be applied to a case of realizing a streaming distribution service adopting DASH in a standard other than ATSC 3.0.

The client device (3.0 Client (with ATSC 3.0 PHY/MAC)) 100 is assumed to be built in, for example, a television receiver, a video recorder, or a set top box installed in a general house or mounted in a moving body such as an automobile.

The client device 100 includes a broadcast reception unit (client ATSC middleware) 110, a communication unit (Ethernet/WiFi or the like) 120, a proxy server unit (client local HTTP proxy server) 130, and a DASH client unit (3.0 DASH client) 140.

The broadcast reception unit 110 executes processing of receiving MPD, a segment file of a stream, an SLS file, and the like distributed from a broadcaster (corresponding to the broadcast server in FIG. 6) via a broadcast network 11 such as terrestrial digital broadcast or satellite broadcast.

The broadcast reception unit 110 includes a tuner unit 111 that receives a broadcast wave, a segment retriever 112 that extracts a segment file from the broadcast wave, an LLS signaling retriever 113 that extracts a low level signaling (LLS) file from the broadcast wave, and an LLS signaling parser 114 that analyzes the LLS file. Moreover, the broadcast reception unit 110 includes an SLS signaling retriever 115 that extracts a service layer signaling (SLS) file from the broadcast wave, and an SLS signaling parser 116 that analyzes the SLS file.

The communication unit 120 executes processing of requesting (transmitting an HTTP request) the broadcaster (corresponding to the DASH server and the web server in FIG. 6) to transmit the MPD, the segment file of a stream, the SLS file and receiving the MPD and the segment file HTTP-distributed in response to the request, via a CDN 12 formed in a bidirectional communication network such as the Internet.

The proxy server unit 130 includes a proxy cache 131 that caches various files received via the broadcast network 11, a proxy cache 132 that caches various files received via the CDN 12, a broadcast/broadband address resolver 133 that handles a request from the DASH client unit 140.

The broadcast/broadband address resolver 133 executes processing of supplying the MPD and the segment file cached in proxy cache 131 or 132 in response to the request from the DASH client unit 140.

Moreover, the broadcast/broadband address resolver 133 executes processing of notifying the DASH client unit 140 of supply availability information indicating a reception state and the like of the segment file by the broadcast reception unit 110 and the communication unit 120, using a PER message.

Moreover, the broadcast/broadband address resolver 133 executes processing of notifying the DASH client unit 140 of broadcast distribution simultaneous use information indicating whether or not each segment file is distributed by broadcast distribution together with net distribution, and a ROI identifier indicating a belonging ROI in a case where each segment file belongs the ROI, using the PER message. Details of the PER message will be described below.

The DASH client unit 140 includes an MPD retriever 141 that requests and acquires the MPD, an MPD parser 142 that analyzes the MPD, a segment retriever 143 that requests and acquires the segment file by reference to the MPD, and an MP4 parser 144 that extracts and analyzes MP4 data from the segment file. Moreover, the DASH client unit 140 includes a decoder 145 that decodes the MP4 data and a renderer 146 that renders a decoding result.

The DASH client unit 140 is realized on, for example, a browser installed in the client device 100. However, the DASH client unit 140 may be realized not only as a browser application but also as a native application. The DASH client unit 140 executes processing of acquiring the MPD, the segment file, the SLS file, and the like received by the broadcast reception unit 110 or the communication unit 120 via the proxy server unit 130, and rendering a stream and controlling the application, thereby to output a video and sound of the stream to a monitor at a subsequent stage (not illustrated).

Note that the DASH client unit 140 can be installed not only in the client device 100 but also in a client device 200 connected to the client device 100 via a LAN 20. The client device 200 is assumed to be, for example, a smartphone, a tablet, or the like.

The DASH client unit 140 in the client device 200 is connected to the client device 100 via the LAN 20, and can execute processing of acquiring the MPD, the segment file, the SLS file, and the like received by the broadcast reception unit 110 or the communication unit 120 via the proxy server unit 130 of the client device 100, and rendering the stream and controlling the application, thereby to output a video and sound of the stream to a monitor at a subsequent stage (not illustrated).

Note that, although not illustrated, a supply device having a configuration in which the DASH client unit 140 is omitted from the client device 100 may be connected to the LAN 20. In that case, the client devices 100 and 200 can also request the supply device to supply the MPD, the segment file, and the like.

As described above, the DASH client unit 140 in the client device 100 and the DASH client unit 140 in the client device 200 always acquire various files via the proxy server unit 130. Therefore, the DASH client unit 140 can realize so-called network transparency in which it is not necessary to be aware of distinction between the broadcast distribution via the broadcast network 11 and the net distribution via the CDN 12 by which various files to be acquired are distributed. Therefore, the portability of the DASH client unit 140 increases and thus the DASH client unit 140 can be mounted to a device that cannot receive broadcast.

Next, the proxy server unit 130 will be described in detail. When acquisition of various files is requested from the DASH client unit 140 (the HTTP request is received), the proxy server unit 130 determines which of via the broadcast network 11 and via the CDN 12 the broadcast/broadband address resolver 133 acquires the various files. Information as a material for the determination is provided from the SLS signaling parser 116 of the broadcast reception unit 110.

The SLS signaling parser 116 of the broadcast reception unit 110 requests the SLS signaling retriever 115 to acquire USBD/USD, S-TSID, and the like that are signaling metadata of ATSC 3.0. The SLS signaling retriever 115 extracts the signaling metadata carried by an SLS LCT packet from a broadcast signal received by a tuner unit (ATSC 3.0 PHY/MAC) 111.

Furthermore, the SLS signaling parser 116 acquires signaling metadata from a url included in the acquisition request of the segment file, and acquires broadcast distribution address information for acquiring the target segment file. If it is found that the target segment file is to be distributed by the broadcast distribution in the future or has already been distributed, the SLS signaling parser 116 acquires a segment LCT packet in which the target segment file is stored from the broadcast stream and expands the segment LCT packet within the proxy cache 131 of the proxy server unit 130 on the basis of the broadcast distribution address information. Thereafter, the proxy server unit 130 returns the segment file as a response to the HTTP request to the DASH client unit 140.

If the url of the requested segment file does not exist in the signaling metadata, the proxy server unit 130 acquires the segment file via the communication unit 120 and expands the acquired segment file in the proxy cache 132. Thereafter, the proxy server unit 130 returns the segment file as a response to the HTTP request to the DASH client unit 140.

<PER Message>

Next, the PER message will be described. The supply availability information, the broadcast distribution simultaneous use information, and the ROI identifier are stored by extending the PER message to be described below.

Figure 8:
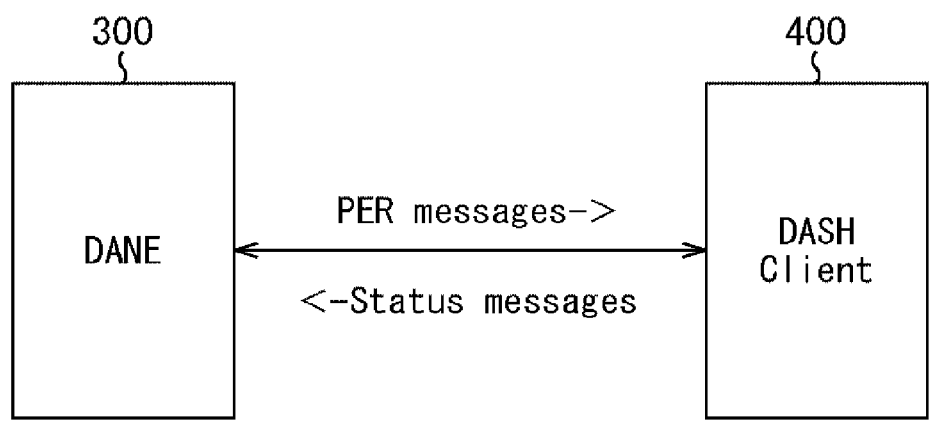
FIG. 8 is a diagram for describing a PER message.

FIG. 8 is a diagram for describing the PER message. The PER message is a message of which a DASH-aware network elements (DANE) 300 notifies a DASH Client 400.

Here, the DANE 300 corresponds to the proxy server unit 130 of the DASH client device 100 illustrated in FIG. 7. The DASH Client 400 corresponds to the DASH client unit 140 of the DASH client device 100.

In DASH, definition of a protocol called SAND is being studied. The SAND is a protocol for exchanging and providing various types of real-time network environment (distribution resource) information that can be provided from a DASH distribution component group managed by a network operator to effectively operate the DASH.

In the SAND, PER is defined as a message protocol of a message (PER message) provided from the DANE 300 to the DASH Client 400. Furthermore, a status is defined as a message protocol of a message (status message) provided from the DASH Client 400 to the DANE 300. Note that, hereinafter, the PER message or the status message is also referred to as a SAND message.

In PER, a message called ResourceStatus and a message called DaneResourceStatus as a similar message to the ResourceStatus are defined.

FIG. 9 is a diagram for describing elements of the ResourceStatus. In the present embodiment, a status element of the ResourceStatus is extended so that the supply availability information can be stored, and the proxy server unit 130 notifies the DASH client unit 140 of the extension.

Moreover, a reason element of the ResourceStatus is extended so that the broadcast distribution simultaneous use information and the ROI identifier can be stored, and the proxy server unit 130 notifies the DASH client unit 140 of the extension. The Reason element may further describe metadata of a ROI sequence indicated by the ROI identifier (for example, a name of a player that the ROI sequence follows and is moved with and the like). Note that the metadata of the ROI sequence indicated by the ROI identifier is supplied to the client device 100 via the broadcast distribution or the net distribution.

The DASH client 400 that has received the ResourceStatus can select a DASHsegment file to be requested next on the basis of the ResourceStatus. Note that, since an effective period is described in the ResourceStatus, the DASH client 400 can regard that the contents is effective within the effective period of the ResourceStatus.

<Real-Time Object Delivery Over Unidirectional Transport (ROUTE) Protocol>

Next, a ROUTE protocol will be described. In ATSC 3.0, the standardization work of IP based transport stack is being performed, and a file based on a MPEG-DASH file format (ISO-BMFF file or MP4 file), which is becoming mainstream in OTT distribution, is transferred using the ROUTE protocol obtained by extending file delivery over unidirectional transport (FLUTE).

By use of the ROUTE protocol, a fragmented MP4 (fragmented MP4 file) file sequence of DASH, MPD that is a control metafile of DASH, various types of signaling (USD of ATSC version obtained by extending 3GPP-MBMS-USD (user service description), S-TSID that is control metadata of the ROUTE protocol, and the like) can be transferred.

FIG. 10 illustrates stack based on ROUTE/DASH. The ROUTE protocol is a protocol based on FLUTE, a metadata file describing a transfer control parameter in FLUTE is called file delivery table (FIT), and the control metadata in ROUTE corresponding to FDT is called service-based transport session instance description (S-TSID) (actually S-TSID/ . . . /EFDT is the closest).

The S-TSID describes transfer control metadata about all of service components (video/audio/data component streams-all are realized as file transfer sessions) transferred within a certain service (corresponding to a broadcast channel). The S-TSID itself is also transferred as a service signaling session in a ROUTE session.

Furthermore, although the S-TSID is signaling metadata for a component file session transferred within one service, the S-TSID prepares signaling metadata called service list table (SLT) as bootstrap metadata for resolving an address (service bootstrap address) of a service signaling metadata transfer session for each service in which the S-TSID itself is transferred, and is transferred by special destination IP address/destination port different from services on UDP/IP.

Figure 11:
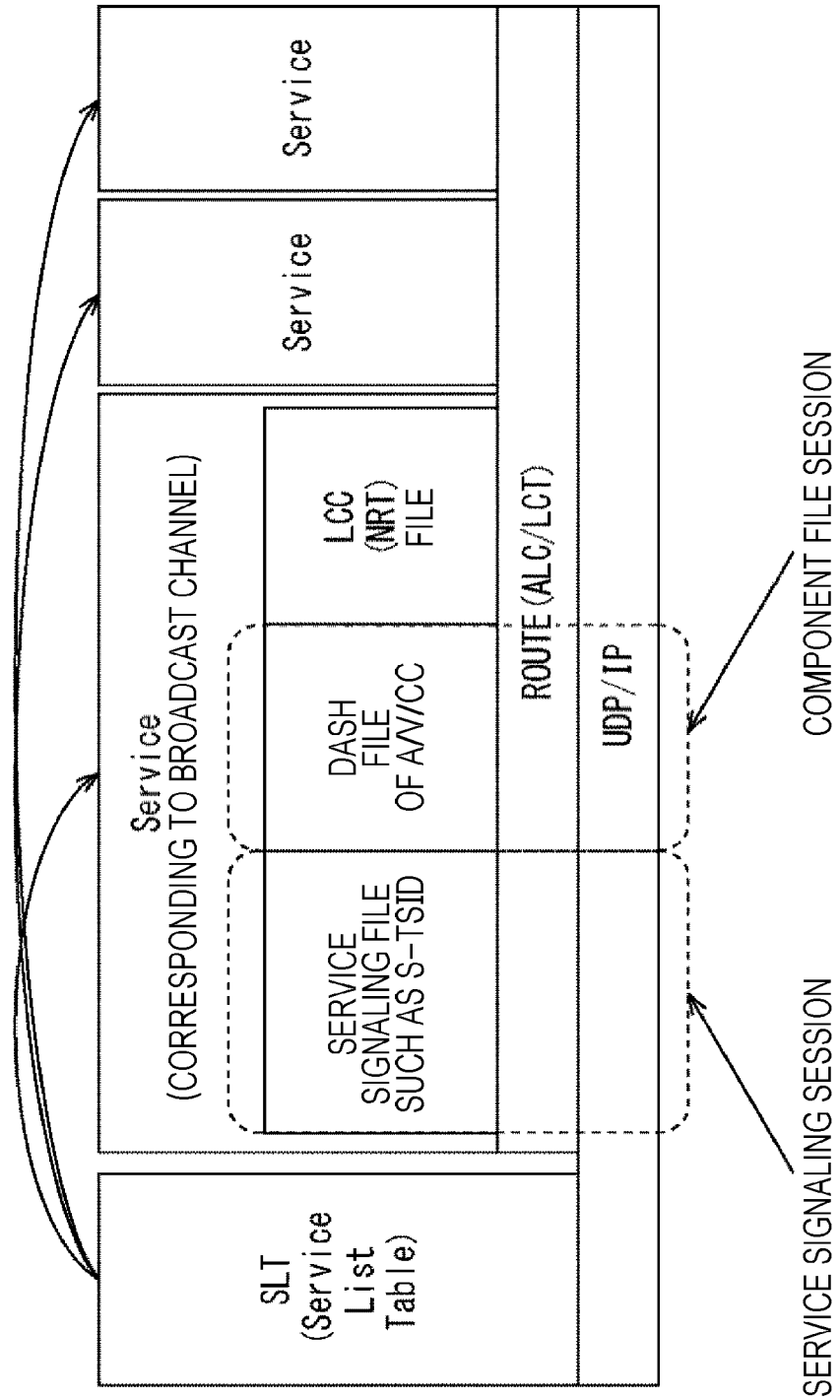
FIG. 11 is a diagram for describing operation on a client side corresponding to a case where a ROUTE protocol is used.

FIG. 11 is a diagram for describing operation on a client side corresponding to a case where a ROUTE protocol is used.

After firstly acquiring the SLT, the client device 110 acquires service signaling (service level signaling) of a desired service from the service bootstrap address, acquires the service component itself configuring the service, and performs rendering.

<Free Viewpoint Streaming Service>

Next, the free viewpoint streaming service that can be realized by the content distribution system according to the present embodiment will be described again.

Figure 12:
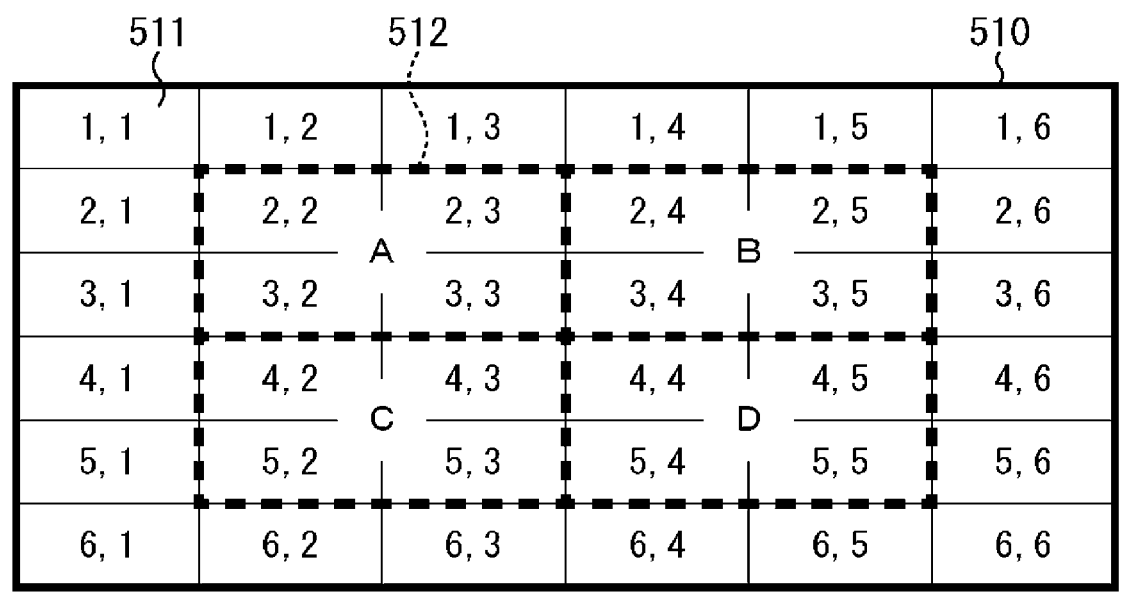
Figure 13:
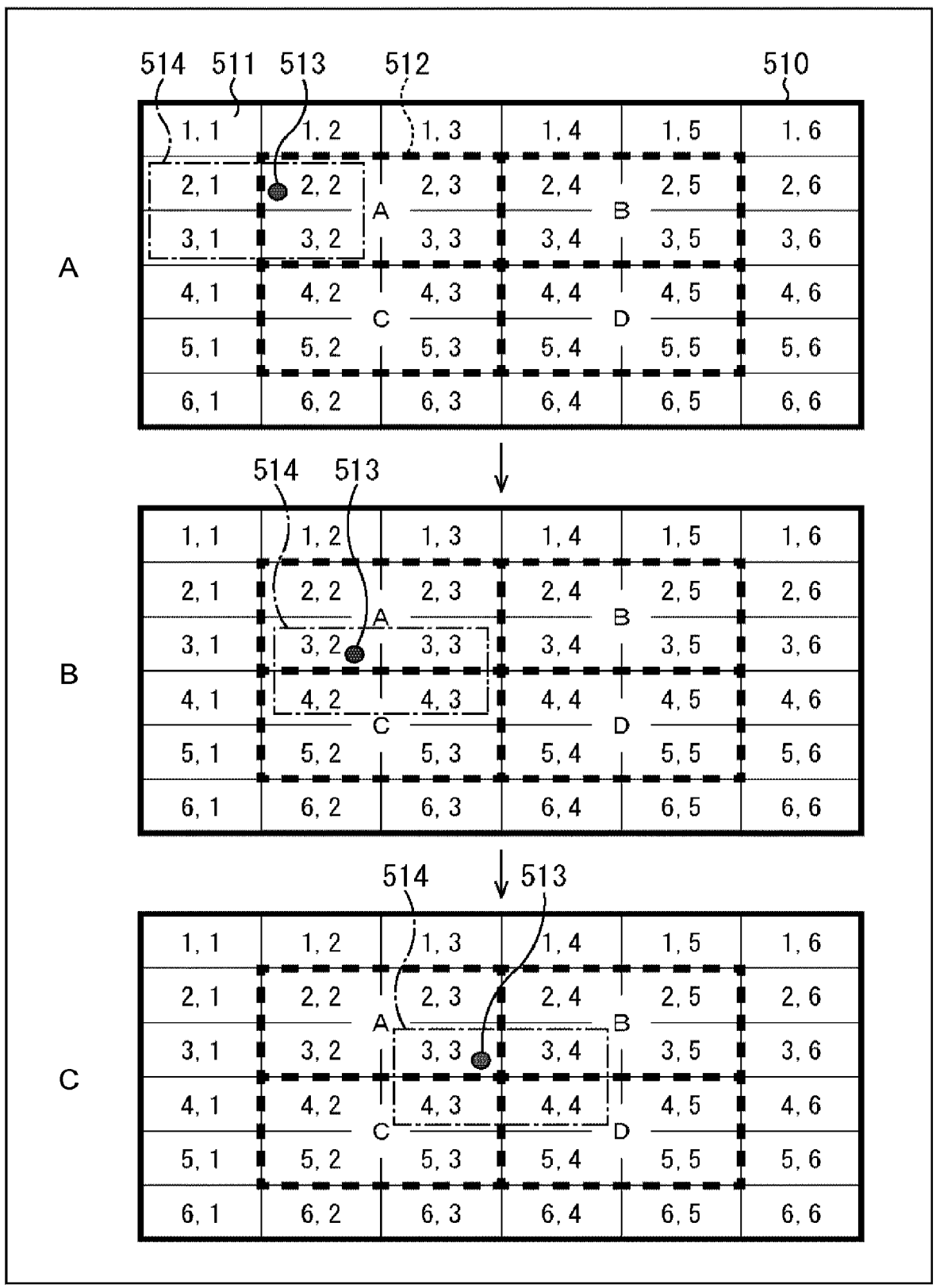
FIG. 13 is a diagram illustrating a relationship among an entire imaging space, rectangular areas, and areas.

FIG. 12 and FIG. 13 are diagrams illustrating examples of cases where an entire imaging space 510 is divided into a plurality of rectangular areas 511.

In the cases in FIGS. 12 and 13, the entire imaging space 510 is divided into 36 rectangular areas 511. Note that (1,1) and the like in FIGS. 12 and 13 indicate arrangement of the rectangular areas 511 in the entire imaging space 510. Here, areas 512A to 512D each including a plurality of the rectangular areas 511 (four in the cases in FIGS. 12 and 13) are set in a center portion of the entire imaging space 510.

For example, in a case where content to be distributed is a soccer game, an entire stadium venue including audience seats is set to the entire imaging space 510, and a field (ground) of the stadium is set to the areas 512A to 512D. Moreover, when a ball 513 moves during the game, an area following the movement is set as a ROI 514 and changes as illustrated in A in FIG. 13 to C in FIG. 13.

In the case illustrated in FIGS. 12 and 13, each of videos of the areas 512A to 512D is allocated to one AdaptationSet and each of videos of each rectangular areas 511 is allocated to AdaptationSet of DASH. Then, segments corresponding to the videos of the respective areas 512A to 512D and a segment corresponding to the video of the ROI 514, which have a high possibility of being commonly viewed by many users, are distributed by the broadcast distribution. Then, segments corresponding to the videos of the other rectangular areas 511 are distributed by the net distribution. Note that the segments belonging to all the AdaptationSets are also distributed by the net distribution in consideration of users who cannot receive the broadcast distribution and omission of the broadcast distribution (reception errors).

Figure 14:
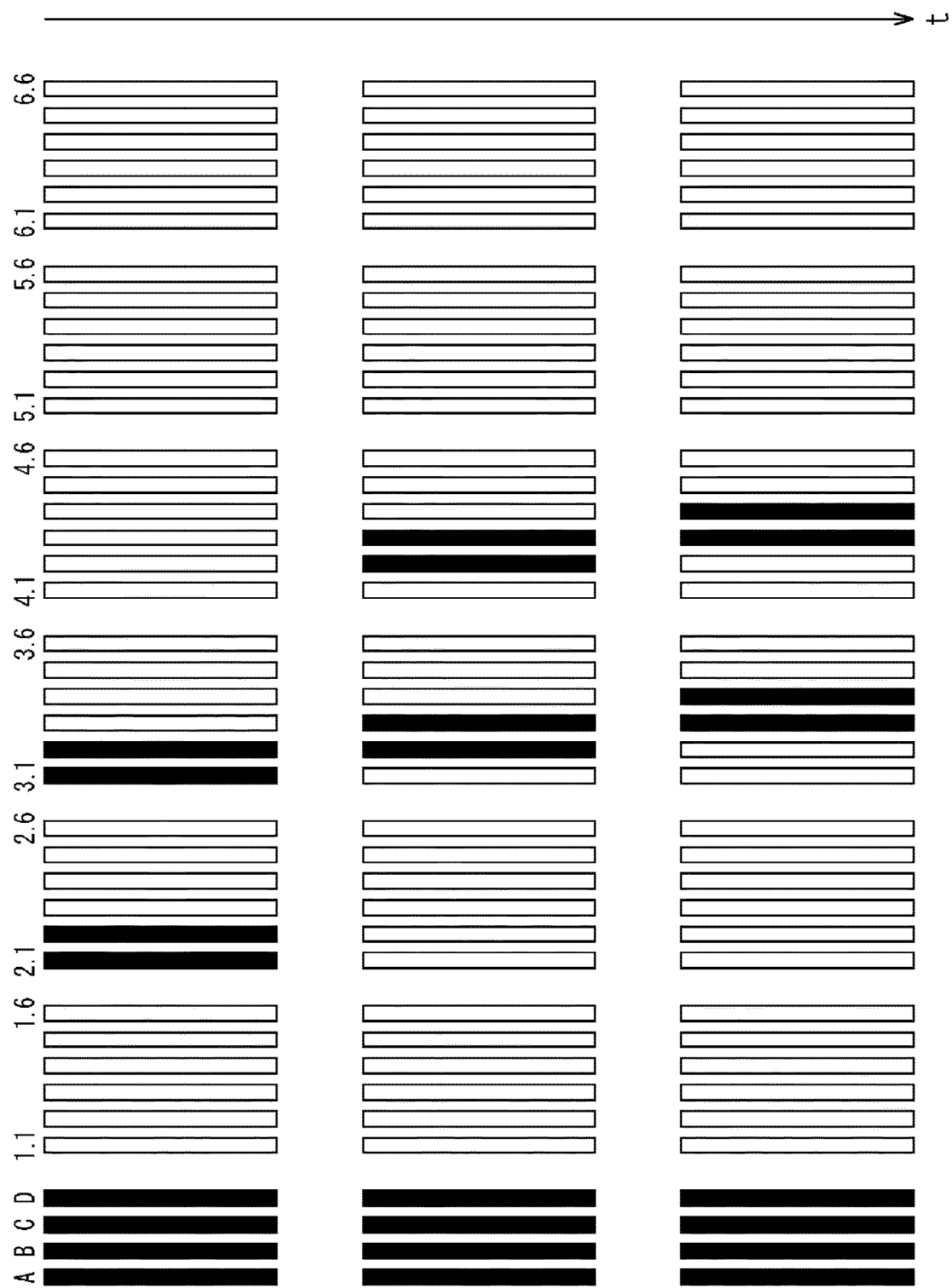
FIG. 14 is a diagram illustrating a state of change of segments distributed by broadcast distribution corresponding to movement of an ROI illustrated in FIG. 11.

FIG. 14 illustrates whether the segments respectively corresponding to the videos of the areas 512A to 512D and the segments respectively corresponding to the rectangular areas 511 are distributed by the broadcast distribution (colored segments in FIG. 14) or by the net distribution (colorless segments in FIG. 14). Note that an upper row, a middle row, and a lower row in FIG. 14 respectively correspond to A in FIG. 13, B in FIG. 13, and C in FIG. 13.

For example, since the ROI 514 in A in FIG. 13 includes four rectangular areas 511 (2,1, 2,2, 3,1, and 3,2), the segments respectively corresponding to the videos of the areas 512A to 512D and the segments respectively corresponding to the videos of the four rectangular areas 511 (2,1, 2,2, 3,1, and 3,2) are distributed by the broadcast distribution, as illustrated in the upper row in FIG. 14.

Similarly, since the ROI 514 in B in FIG. 13 includes four rectangular areas 511 (3,2, 3,3, 4,2, and 4,3), the segments respectively corresponding to the videos of the areas 512A to 512D and the segments respectively corresponding to the videos of the four rectangular areas 511 (3,2, 3,3, 4,2, and 4,3) are distributed by the broadcast distribution, as illustrated in the middle row in FIG. 14.

Note that, in the example illustrated in FIG. 13, only one ROI following the ball 513 is set. However, for example, a plurality of ROIs such as a ROI following movement of a major player may be set. Note that it is not necessary to distribute all the ROIs by the broadcast distribution, and there may be an ROI distributed by the net distribution according to the possibility of being viewed by the user.

Note that, although not illustrated, the free viewpoint streaming service can also be applied to, for example, a case of mapping an equidistant cylindrical image that is often used in virtual reality (VR) to spatial relation description (SRD).

Figure 15:
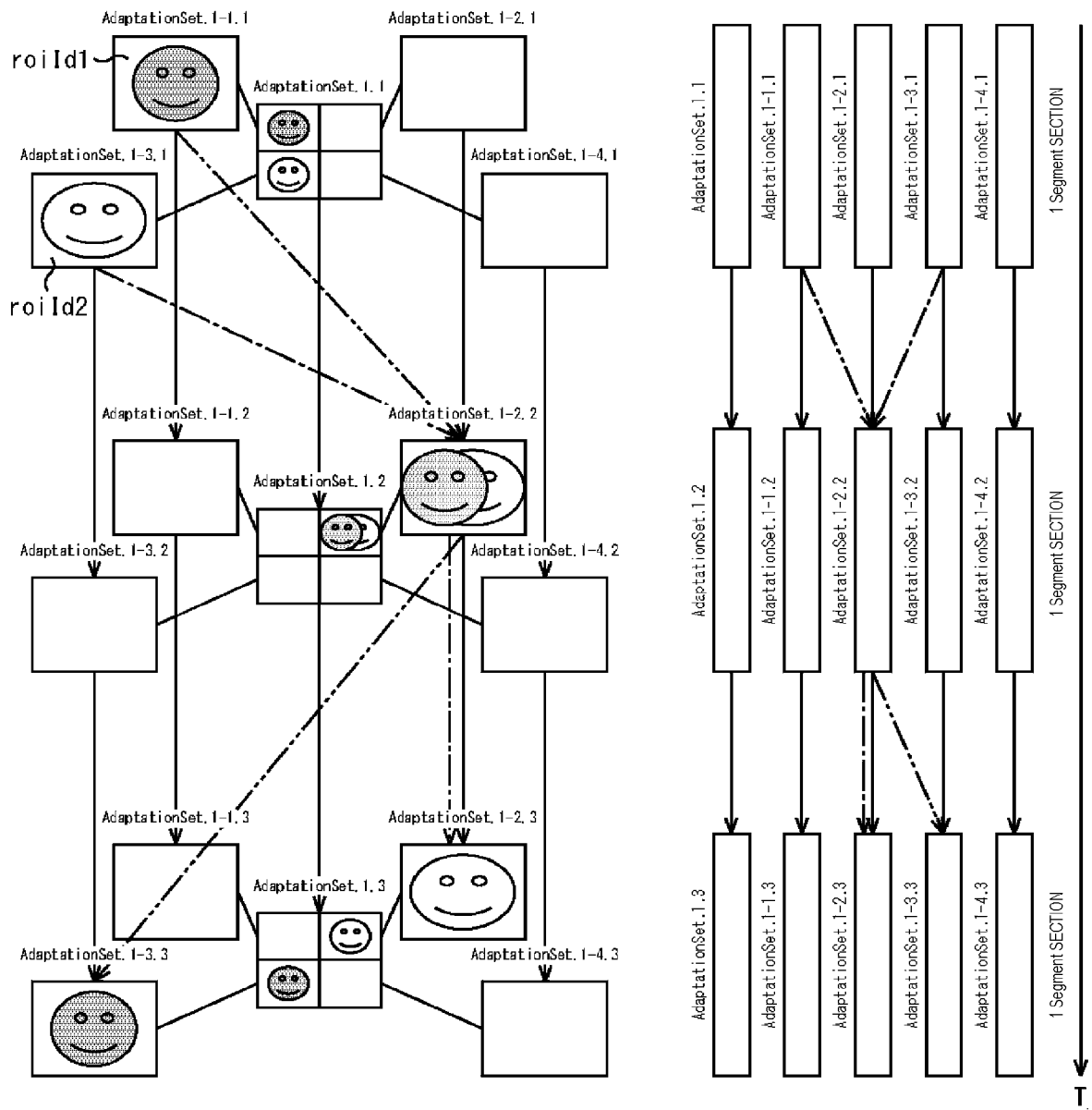
FIG. 15 is a diagram illustrating a case where an entire image is divided into four rectangular areas.

Next, FIG. 15 illustrates an example in which the entire screen (or a predetermined area in the imaging range) is divided into four rectangular areas. Hereinafter, for simplicity of description, a case in which the entire screen is divided into four rectangular areas and the ROI is configured by one rectangular area, and respective videos of the entire screen and the four rectangular areas are allocated to the AdaptationSets of DASH and distributed, as illustrated in FIG. 15, will be described as an example.

In the example of FIG. 15, AdaptationSet.1.T is a stream of the video of the entire screen, and AdaptationSet.1-1.t through AdaptationSet.1-4.t are streams of the respective videos of the upper left, upper right, lower left, and lower right rectangular areas. Note that t is a parameter representing a time series.

Furthermore, in the example of FIG. 15, two systems of roiId1 and roiId2 are set as the ROIs. The roiId1 transitions from the AdaptationSet.1-1.1. to the AdaptationSet.1-2.2 and further to the AdaptationSet.1-3.3. The roiId2 transitions from the AdaptationSet.1-3.1 to the AdaptationSet.1-2.2 and further to the AdaptationSet.1-2.3.

It is assumed that the roiId1 has a higher degree of attention than the roiId2, of the two systems of ROIs, and all the segments belonging to the roiId1 are for the broadcast distribution simultaneous use, and all the segments belonging to the roiId2 are for the net distribution only.

All the segments under the AdaptationSet.1 are for the broadcast distribution simultaneous use in which the net distribution and the broadcast distribution are performed, and a url for the net distribution (for example, described as url with a prefix "bb") is allocated, and a url for the broadcast distribution (for example, described as url with a prefix "bc") is allocated.

The urls for the net distribution are allocated and the urls for the broadcast distribution are allocated to the segments under the AdaptationSet.1-1 to the AdaptationSet.1-4 only in a case where the AdaptationSets are distributed by the broadcast distribution. Only the urls for the net distribution are allocated in a case where the broadcast distribution is not performed (in other words, in the case of only the net distribution).

Furthermore, in a case where each segment belongs to the ROI, the ROI identifier for identifying the ROI sequence is appropriately allocated.

Figure 16:
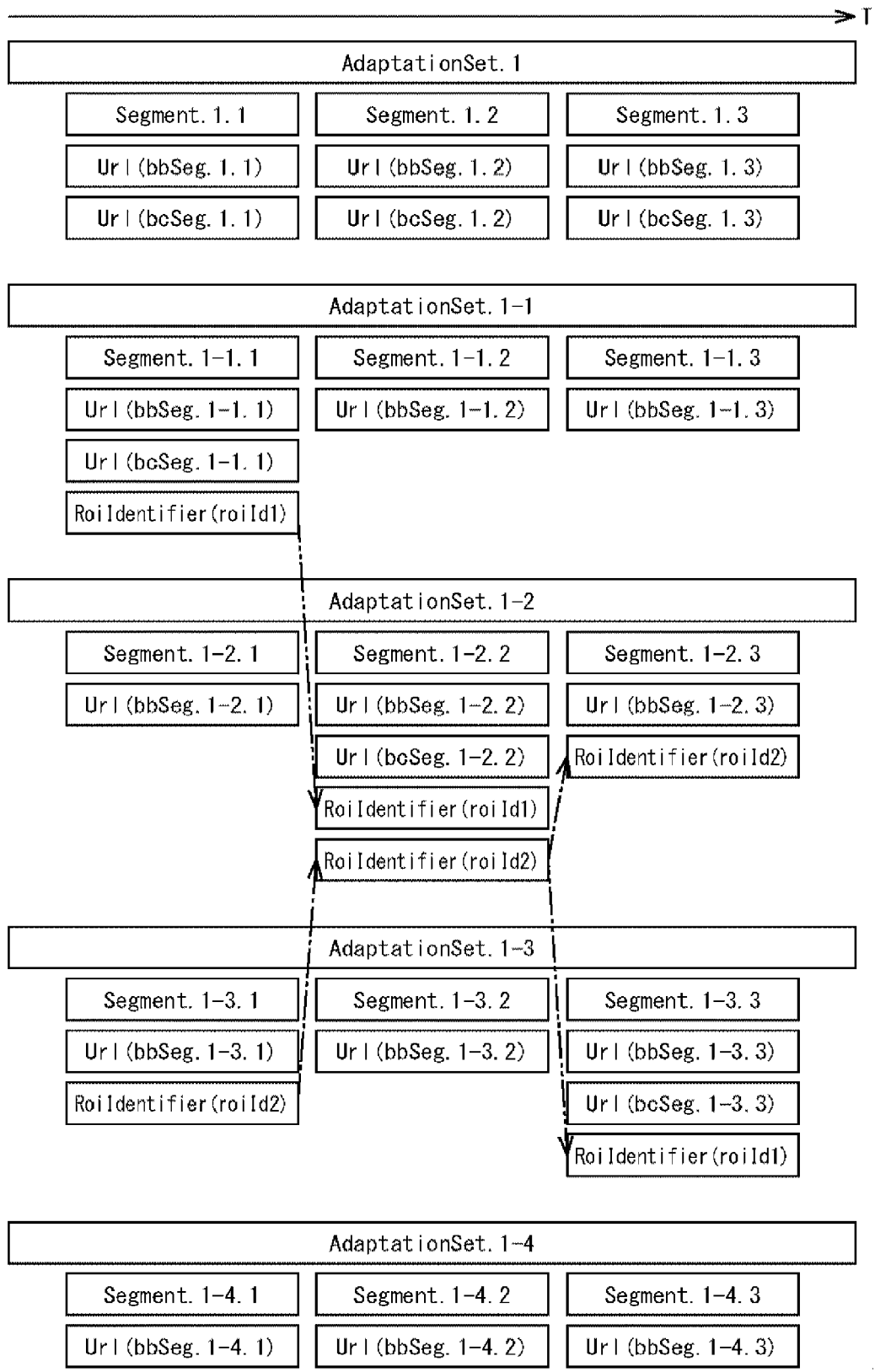
FIG. 16 is a diagram illustrating the presence or absence of simultaneous use of broadcast distribution and ROI identifiers of segments corresponding to FIG. 14.

FIG. 16 illustrates presence/absence of the broadcast distribution simultaneous use and the ROI identifiers of the segments (for example, Segment.1.1 and the like) under the AdaptationSet.1.t and the segments (for example, Segment.1-1.1 and the like) under the AdaptationSet.1-1.t through the AdaptationSet.1-4.t.

For example, a url (bbSeg.1-1.1) described under the Segment.1-1.1 or the like means that the Segment.1-1.1 is distributed by the net distribution. Furthermore, a url (bcSeg.1-1.1) means that the Segment.1-1.1 is distributed by the broadcast distribution. Moreover, RoiIdentifier (roiId1) means that the Segment.1-1.1 belongs to the ROI system of the roiId1.

For example, while in the AdaptationSet.1-1.t corresponding to the upper left rectangular area of the entire screen, the Segment.1-1.1 at t=1 belongs to the roiId1 and is thus for the broadcast distribution simultaneous use (the broadcast distribution and the net distribution are performed), Segment.1-1.2 and Segment.1-1.3 at t=2 and 3 do not belong to the ROI sequence and thus only the net distribution is performed.

Furthermore, for example, while in the AdaptationSet.1-2.t corresponding to the upper right rectangular area of the entire screen, Segment.1-2.1 at t=1 does not belong to the ROI sequence and thus only the net distribution is performed, Segment.1-2.2 at t=2 belongs to the roiId1 and the roiId2 and is thus for the broadcast distribution simultaneous use.

Moreover, for example, in the AdaptationSet.1-3.t corresponding to the lower left rectangular area of the entire screen, Segment.1-3.1 at t=1 belongs to the roiId2 but in a case where the degree of attention is assumed to be low, only the net distribution is performed.

As described above, to describe distribution mode information indicating by which of the broadcast distribution and the net distribution each segment is distributed to the MPD, the url prefix added to the url of each segment under the AdaptationSet is described to a baseURL element that is a child element of the AdaptationSet element.

For example, in a case of AdaptationSet/baseURL="http://a.com/bc", and in a case where AdaptationSet/representation/SegmentList/SegmentURL@media="/segment11.mp4" is described for a predetermined segment belonging to the AdaptationSet, the url of the segment is "http://a.com/bc/segment11.mp4".

Meanwhile, since the ROI identifier cannot be described in units of segments in the current MPD, it is necessary to extend the MPD. Specifically, a roiId element is added to the attribute of the SegmentURL so that the ROI identifier for each segment can be described. For example, <SegmentURL roiId="roiId1"> indicates that the ROI identifier of the segment is "roiId1".

As described above, if the distribution mode information and the ROI identifier in units of segments can be described in the MPD, the client device 100 can acquire the segment file in consideration of the difference between the broadcast distribution and the net distribution by acquiring and analyzing the MPD.

Thus, for example, in a device of a user who wants to view the entire screen, segment sequences are acquired in order of bcSeg.1.1, bcSeg.1.2, and bcSeg.1.3 of SegmentUrls. Furthermore, for example, in a device of a user who wants to view roiId="roiId1", segment sequences are acquired in order of bcSeg.1-1.1, bcSeg.1-2.2, and cSeg.1-3.3. Similarly, in a device of a user who wants to view roiId="roiId2", segment sequences are acquired in order of bbSeg.1-3.1, bcSeg.1-2.2, and bbSeg.1-2.3.

Note that, in the MPD, in a case where the url for the broadcast distribution and the url for the net distribution are described for the same segment (in other words, the segment is for the broadcast distribution simultaneous use), whether receiving the segment by the broadcast distribution or the segment by the net distribution is determined by the client device 100 according to the reception state of the client device 100 itself and the like.

<Case of Storing Distribution Mode Information and ROI Identifier for MPD>

Figure 18:
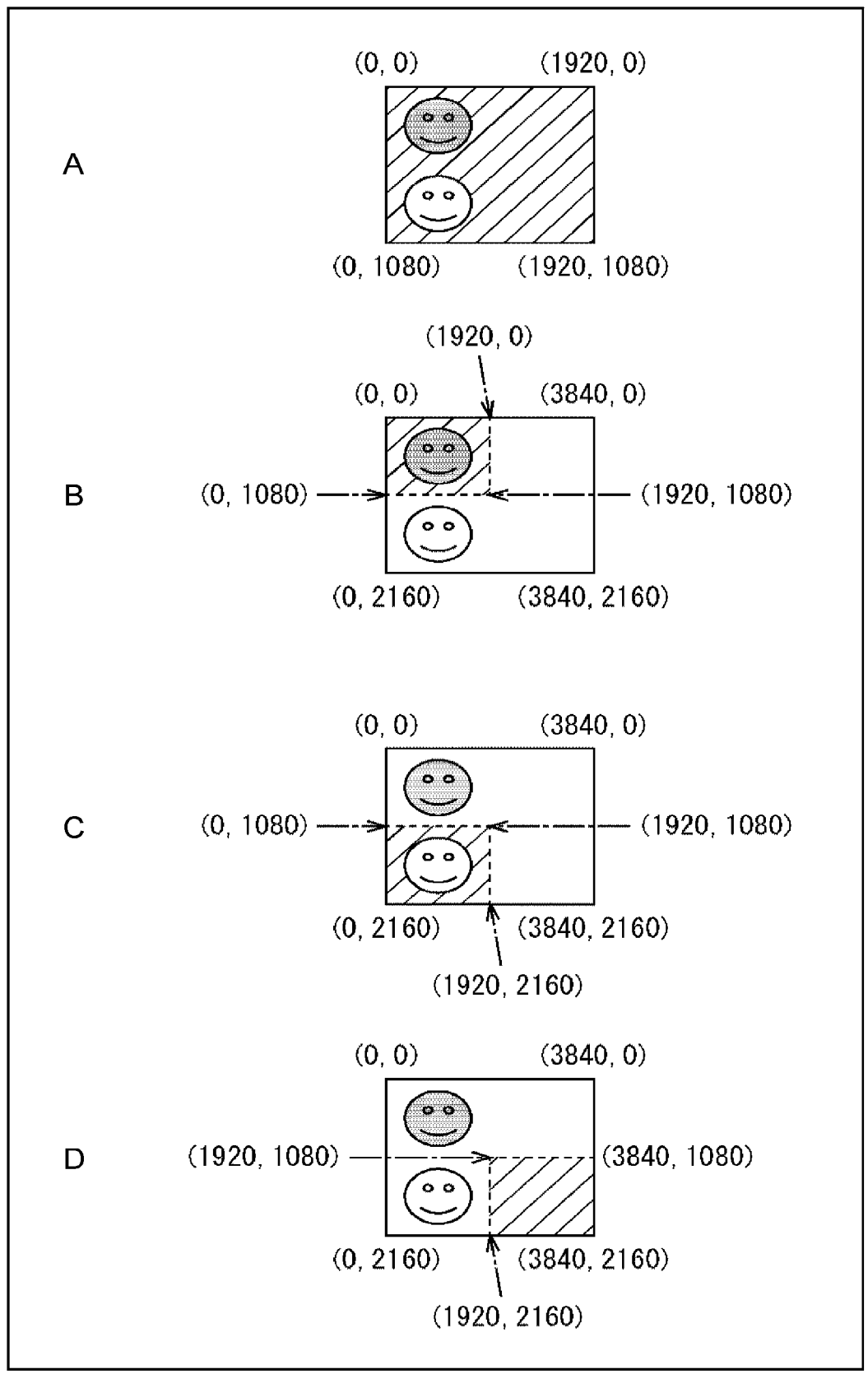
FIG. 18 is a diagram illustrating an entire image and a position and a resolution of a rectangular area in the entire image.

FIG. 17 illustrates the MPD-SRD expression corresponding to the timing of t=1 in the example illustrated in FIGS. 15 and 16. FIG. 18 illustrates an entire image and a position and a resolution of a rectangular area in the entire image.

Description from <AdaptationSet id="1" . . . > to corresponding </AdaptationSet> in MPD-SRD corresponds to the entire screen illustrated by slant lines in A in FIG. 18. Description from <AdaptationSet id="1-1" . . . > to corresponding </AdaptationSet> corresponds to the upper left rectangular area of the entire screen illustrated by the slant lines in B in FIG. 18. The roiId="roiId 1" and the like described here are extended portions of the MPD.

Description from <AdaptationSet id="1-3" . . . > to corresponding </AdaptationSet> corresponds to the lower left rectangular area of the entire screen illustrated by the slant lines in C in FIG. 18. Description from <AdaptationSet id="1-4" . . . > to corresponding </AdaptationSet> corresponds to the upper right rectangular area of the entire screen illustrated by the slant lines in D in FIG. 18.

Figure 19:
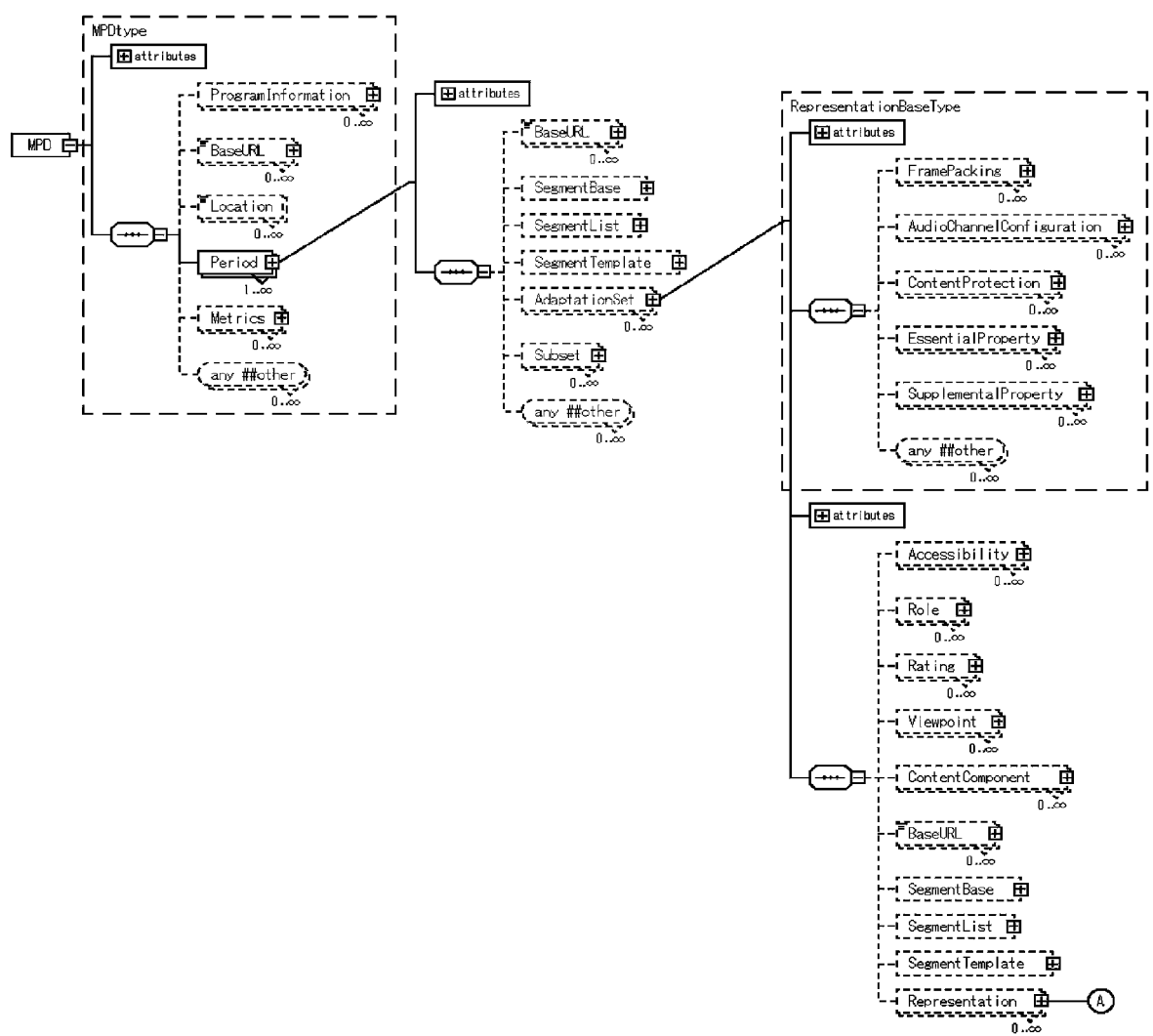
FIG. 19 is a diagram illustrating an extended position of the MPD.
Figure 20:
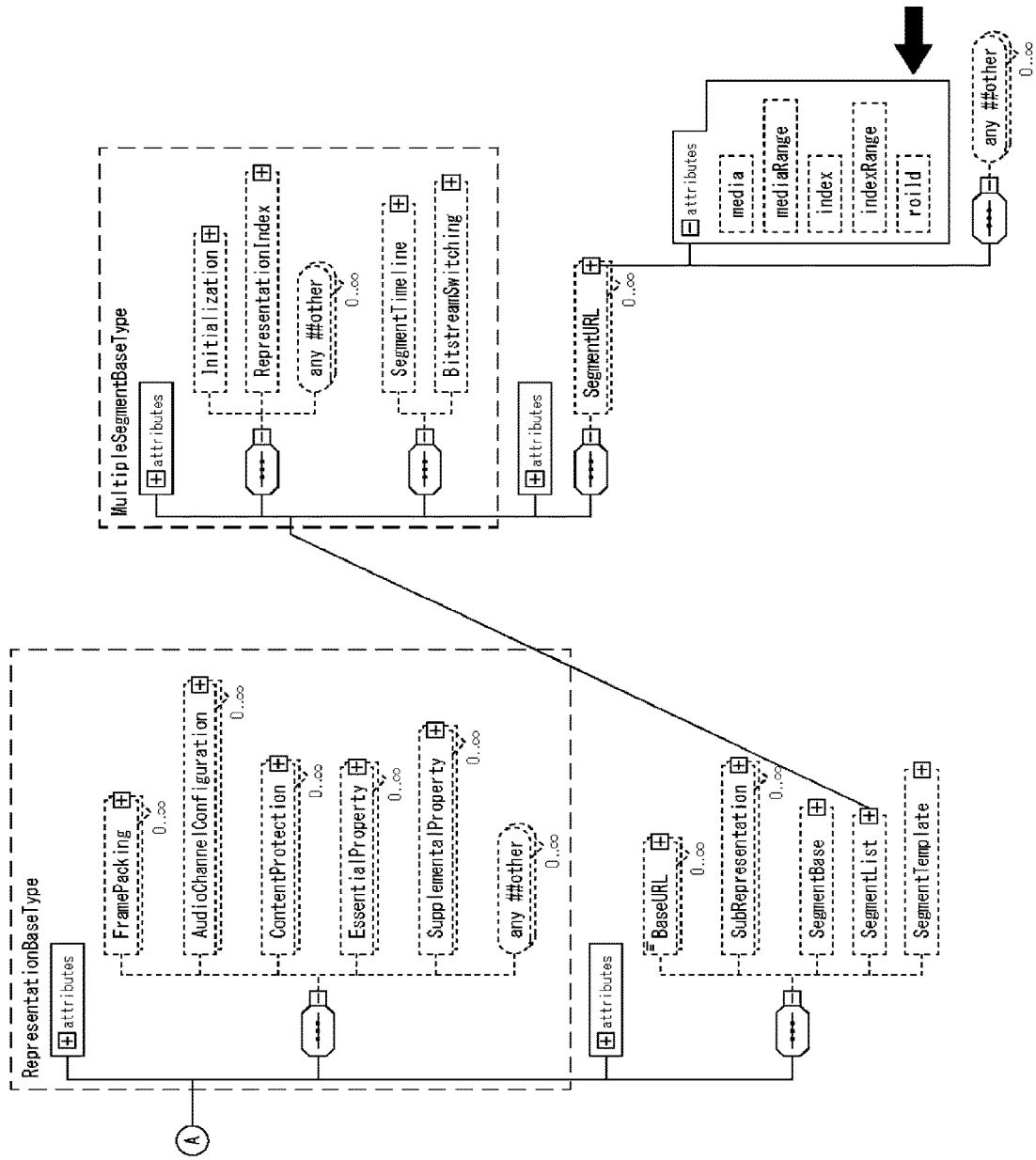
FIG. 20 is a diagram illustrating an extended position of the MPD.

FIGS. 19 and 20 illustrate the MPD in a specific extended position in order to describe the ROI identifier.

As illustrated in FIGS. 19 and 20, the roiId element for describing the ROI identifier is added to the attribute of MPD/period/AdaptationSet/representation/SegmentList/SegmentURL.

Figure 21:
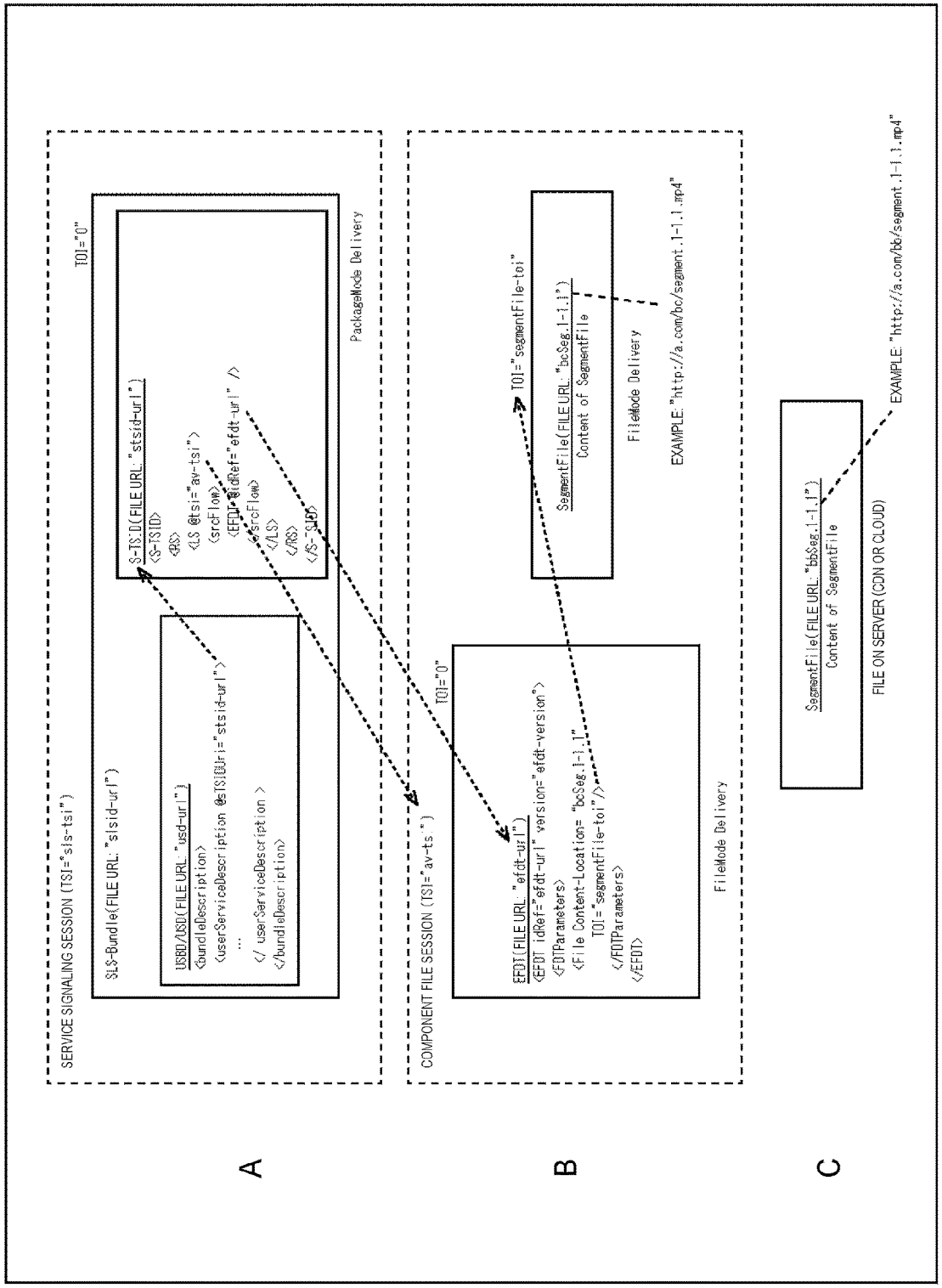
FIG. 21 is a diagram illustrating configurations of a service signaling transport session and a component file transport session corresponding to the extended MPD.

Next, FIG. 21 illustrates configurations of a service signaling transport session and a component file transport session corresponding to the extended MPD.

The service signaling session illustrated in FIG. 21A is a transport session for transferring SLS that is a signaling XML fragment of a service layer. The component file session illustrated in FIG. 21B is a transport session for transferring each moving image/sound/subtitle/application/various data configuring a service. Detailed stream attributes of component sessions are described in the SLS, and an address for acquiring a stream is also described.

In ROUTE file transfer, the session is identified on the basis of TSI of an LCT packet on the UDP/IP, and each file object to be transferred within the session is identified by TOI of the LCT packet.

In the example of FIG. 21A, an sls-bundle file including USD and S-TSID is transferred in the service signaling session identified with TSI="sls-tsi". The sls-bundel file itself is identified with a file URL="slsid-url" and TOI="0", and an USD file and an S-TSID file stored in the file are respectively identified with file URLs="usd-url" and "stsid-url". (What is necessary in reconfiguring the file in an LCT layer is a set of TSI and TOI and the sls-bundle file itself is reconfigured by the TOI="0". Therefore, the USD and the S-TSID files stored in the sls-bundle file do not require the TOI (this is called file transfer of PackageMode in the ROUTE). Each service attribute is described in userServiceDescription for USD (USBD/USD).

The userServiceDescription has an sTSIDUri attribute to store the url ("stsid-url") of the S-TSID file. Attributes of components are described in S-TSID/RS/LS/srcFlow in the S-TSID.

The example of FIG. 21A illustrates that the S-TSID includes one component, file groups configuring the component are transferred in a session identified with TSI="av-tsi", EFDT in which attributes of the file groups of the session are described is transferred in the same session as the file groups, and the EFDT is identified with a URL="efdt-url". One file transferred in the same session is described in the EFDT transferred in the session identified with the TSI="av-tsi", and the file is identified with a file URL="bcSeg.1-1.1", and the file can be reconfigured by collecting LCT packets with the TOI="segmentFile-toi". The contents of the segments are stored in the reconfigured file identified with the file URL="bcSeg.1-1.1".

Therefore, when the DASH client unit 140 of the client device 100 issues a segment acquisition request with a predetermined segment URL, the proxy server unit 130 having received the request acquires and reconfigures a desired file from the SLS signaling fragment and EFDT acquired and analyzed via the signaling retriever 113 and the signaling parser 114 of the ATSC 3.0 middleware 110, and returns the reconfigured file as a response to the DASH client unit 140.

Meanwhile, in a case of acquiring the same file from the net distribution, an HTTP request is issued to SegmentFile (file URL "bbSeg.1-1.1") illustrated in FIG. 21C, and a file supplied in response to the HTTP request is acquired.

Figure 22:
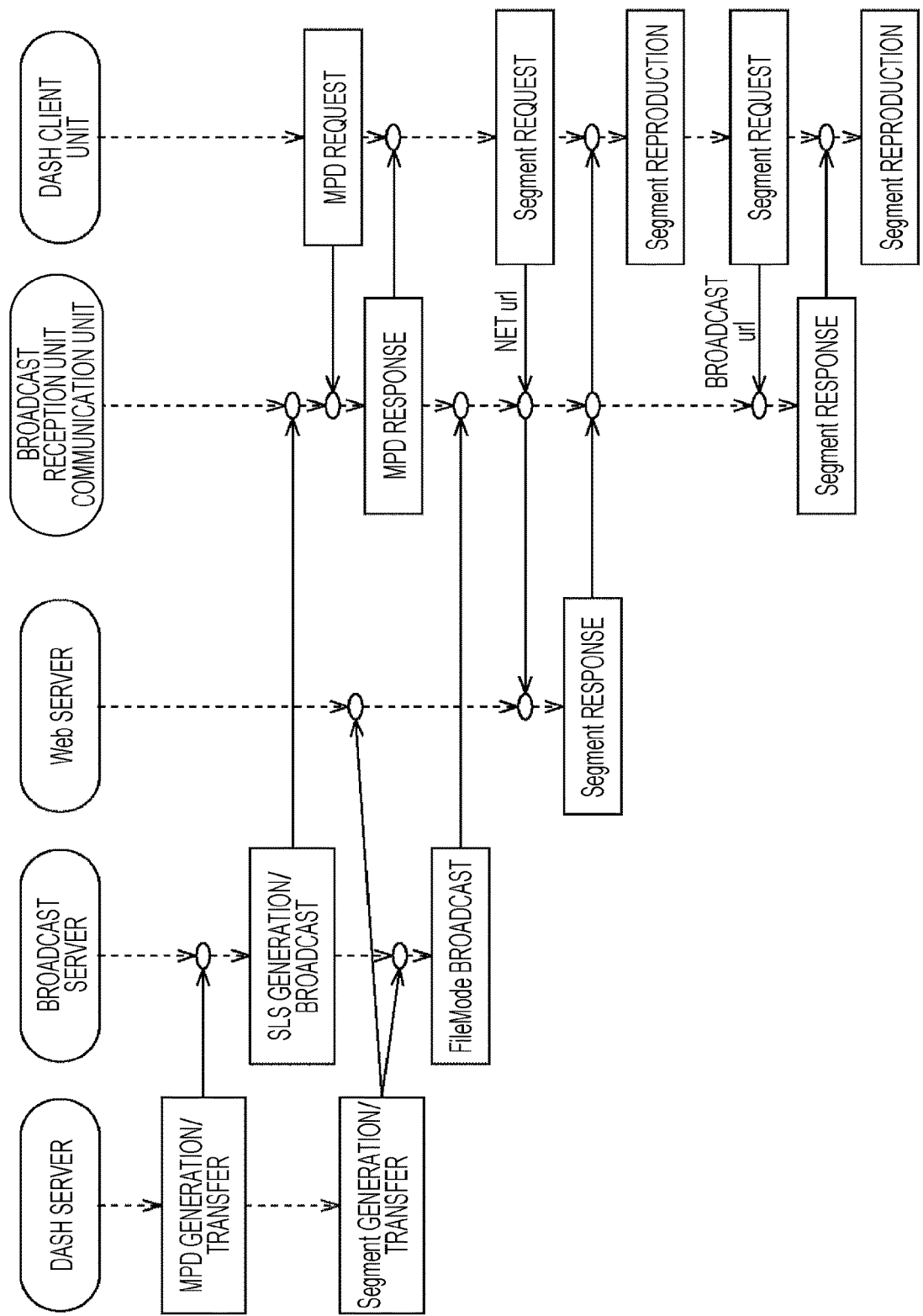
FIG. 22 is a diagram illustrating an operation sequence in a case where distribution mode information and the ROI identifier are stored in the MPD.

Next, FIG. 22 illustrates an operation sequence in a case where the distribution mode information and the ROI identifier are stored in the MPD.

On the distribution side, the DASH server generates the MPD in which the distribution mode information is described for each segment and the ROI identifier is appropriately stored, and transfers the MPD to the broadcast server. Furthermore, the DASH server generates segment files of a content stream and transfers the segment files to the web server, and also transfers a segment file for broadcast distribution simultaneous use, of the segment files, to the broadcast server.

The broadcast server to which the MPD has been transferred generates an SLS file and distributes the generated SLS file and the transferred MPD by the broadcast distribution via the broadcast network. Furthermore, the broadcast server distributes the segment files of the content stream transferred from the DASH server by the broadcast distribution in FileMode of ROUTE.

In the client device 100 on the reception side, the broadcast reception unit 110 receives the MPD and the SLS file distributed by the broadcast distribution. Thereafter, when the DASH client unit 140 requests the broadcast reception unit 110 to supply the MPD, the broadcast reception unit 110 supplies the MPD to the DASH client unit 140 in response to the request. Note that, in a case where the broadcast reception unit 110 does not receive the MPD distributed by the broadcast distribution, the communication unit 120 can issue an HTTP request to the DASH server and acquire the MPD distributed by net distribution.

The DASH client unit 140 can select a requested segment on the basis of the ROI identifier or the like described in the MPD. In a case where the DASH client unit 140 requests the segment to be distributed by the net distribution on the basis of the MPD, the communication unit 120 issues the HTTP request for requesting the segment to the web server, receives the segment supplied (net distribution) from the web server, and supplies the segment to the DASH client unit 140. The DASH client unit 140 reproduces the supplied segment.

Furthermore, in a case where the DASH client unit 140 requests a segment to be distributed by the broadcast distribution on the basis of the MPD, the broadcast reception unit 11 receives the segment distributed by the broadcast distribution and supplies the segment to the DASH client unit 140. The DASH client unit 140 reproduces the supplied segment.

The description of the operation sequence in the case of storing the distribution mode information and the ROI identifier in the MPD is terminated.

<Handling of Case of Using SegmentTemplate for MPD>

By the way, in a case where using DASH for distribution such as live broadcast, if the SegmentUrl is listed in the SegmentList, the data size of the MPD becomes extremely large (assuming that the time of the segment alone is about 0.5 seconds in the case of ATSC 3.0 or the like). Therefore, in a normal case, the SegmentTemplate is used for the MPD.

Figure 24:
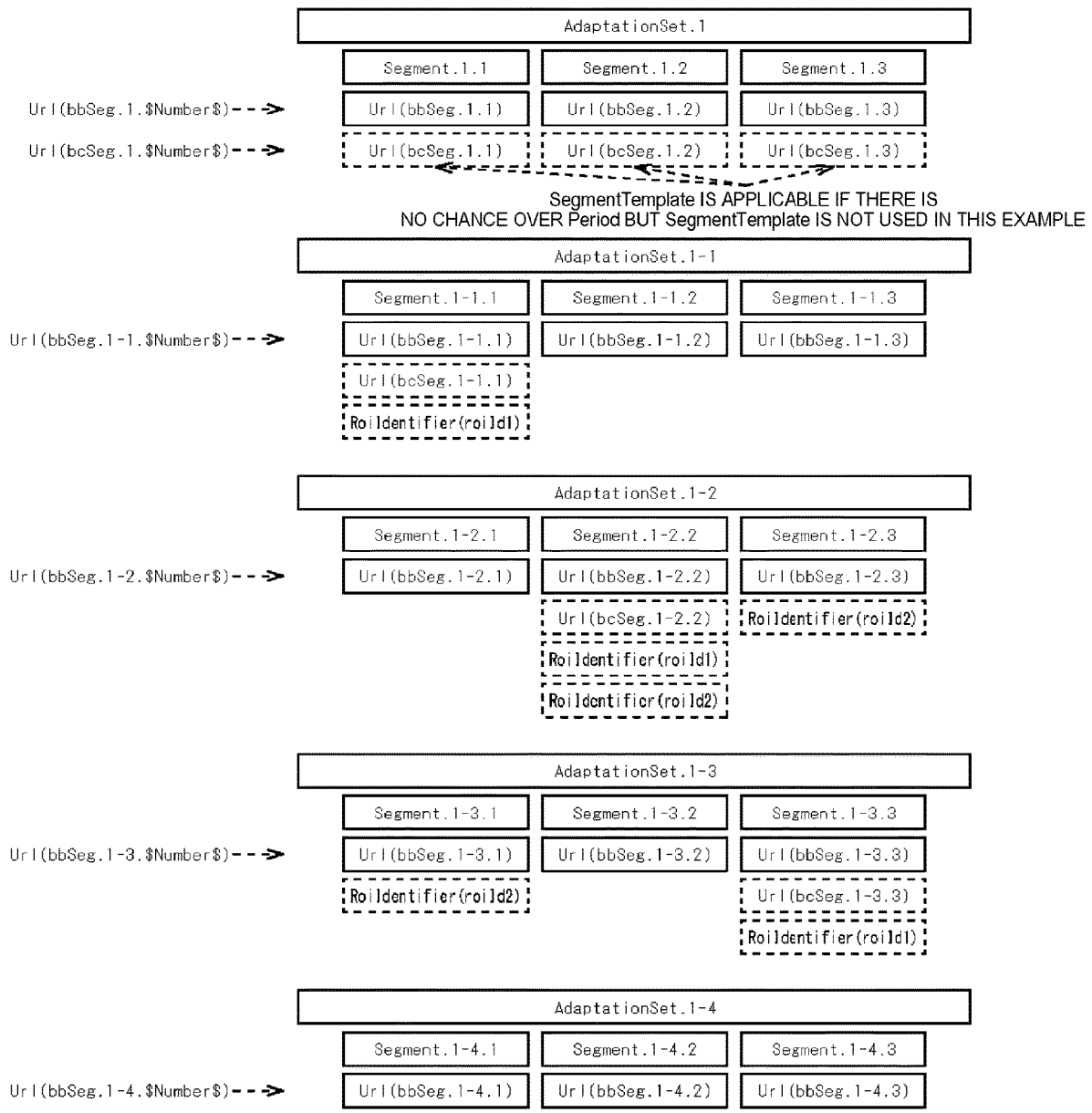
FIG. 24 is a diagram for describing the MPD-SRD expression in FIG. 23.

FIG. 23 is a diagram in which the MPD-SRD expression illustrated in FIG. 17 is rewritten using the SegmentTemplate. FIG. 24 is visualization of the MPD-SRD expression in FIG. 23. Note that the SegmentUrl and ROI identifiers in the broken line frames and the one-dot chain line frames in FIG. 24 represent portions that cannot be described by the MPD-SRD expression in FIG. 23.

By using the SegmentTemplate for the MPD, the data size of the MPD can be greatly reduced. Note that, since the same generation rule is applied to the SegmentTemplate in units of periods, different attributes (in this case, the distribution mode information and the ROI identifier) cannot be described for each segment.

As is clear from comparison between FIG. 24 and FIG. 16, in a case where the SegmentTemplate is used, it is not possible to specify the broadcast distribution url and the net distribution url for a certain segment, and to specify only the net distribution urls for the other segments in segment sequences arranged in time series under the same period. Furthermore, it is not possible to specify the ROI identifier only for a specific segment.

Therefore, in a case of using the SegmentTemplate for the MPD, it is necessary to store the distribution mode information and the ROI identifier that cannot be specified for individual segments to somewhere other than the MPD and signal the distribution mode information and the ROI identifier to the reception side.

<Case of Storing Distribution Mode Information and ROI Identifier in USD>

Next, a method of extending the USD of the SLS signaling and signaling the distribution mode information and the ROI identifier of each segment will be described.

The distribution mode information of each segment can be signaled in conventional USD.

The USD is associated with the MPD and when part (or all) of urls listed in the bundleDescriptionROUTE/userServiceDescription/deliveryMethod/broadcastAppService/basePattern (a url matching pattern for the broadcast distribution) or . . . /unicastAppService/basePattern (a url matching pattern for the net distribution) matches the url of the segment, the segment is distributed by the broadcast distribution via the ROUTE of the broadcast network or by the net distribution via the CDN.

Furthermore, the segment distributed by the broadcast distribution and the segment distributed by the net distribution being the same can be indicated using a set of urls grouped in bundleDescriptionROUTE/userServiceDescription/deliveryMethod/appService/identicalContent.

Figure 25:
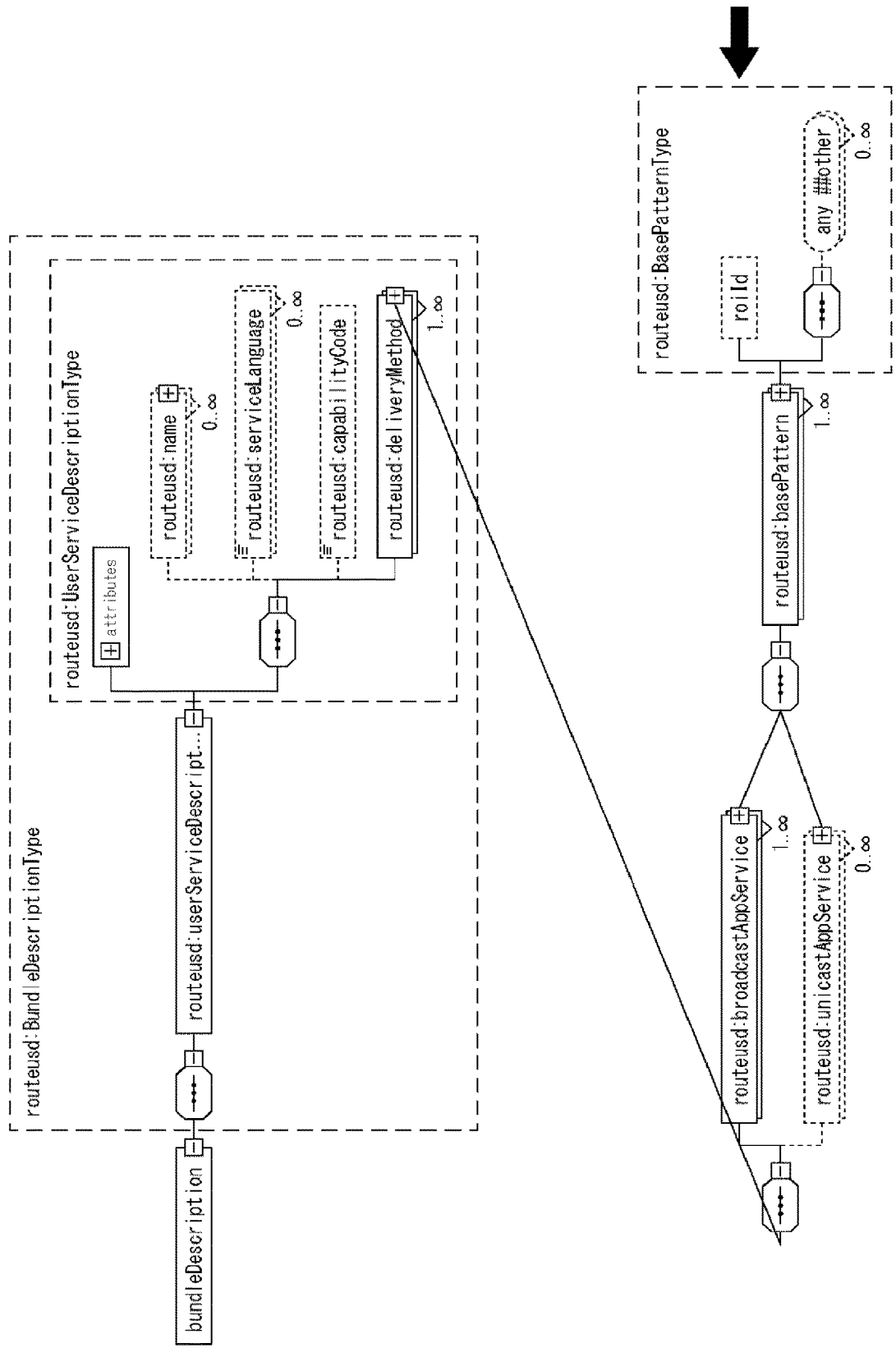
FIG. 25 is a diagram illustrating an extended position of USD.

FIG. 25 illustrates the USD at a specific extended position in order to store the ROI identifier. As illustrated in FIG. 25, as for the ROI identifier (roiId), an attribute of the basePattern of each segment is extended to store the ROI identifier.

Figure 26:
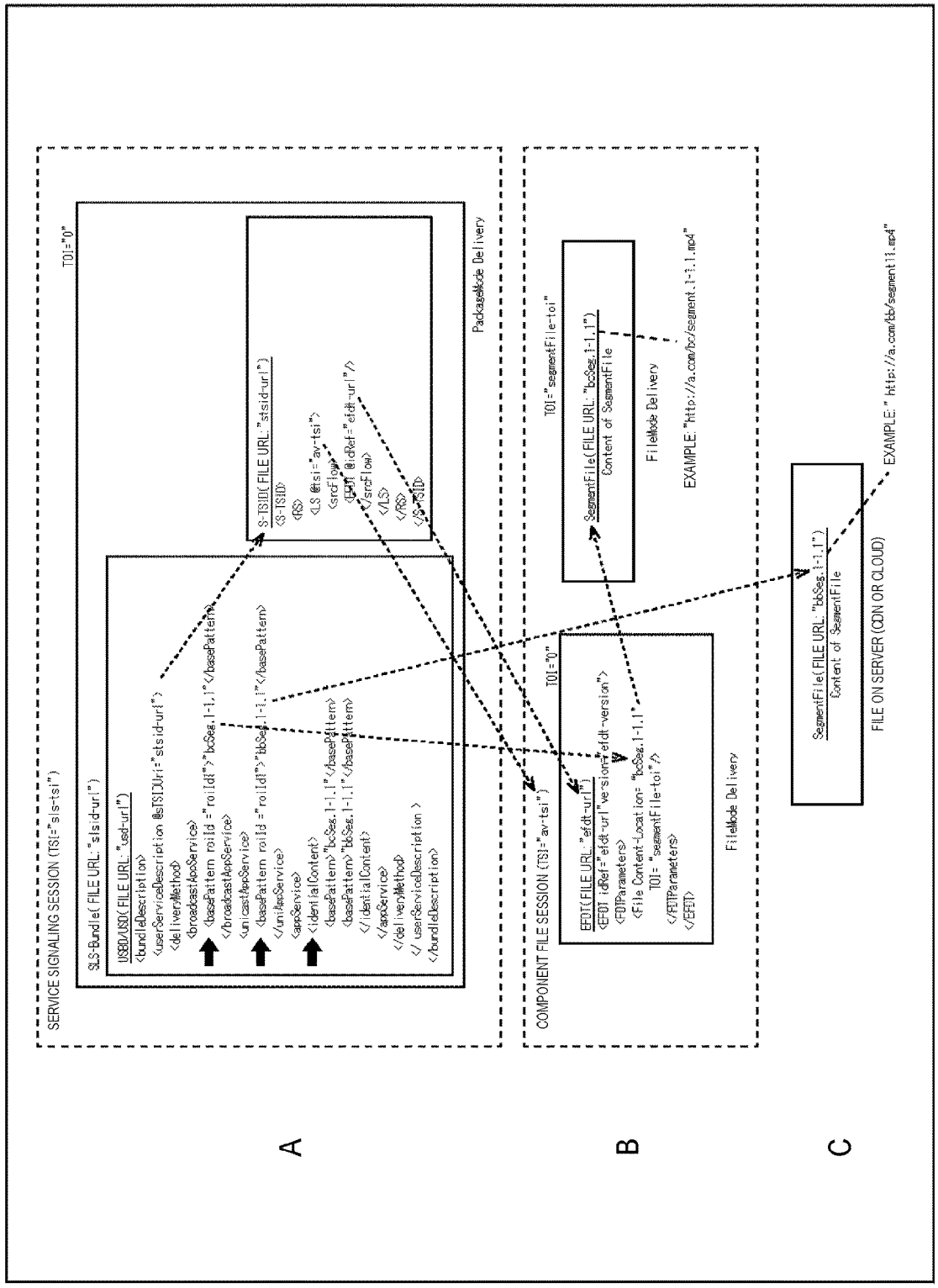
FIG. 26 is a diagram illustrating configurations of a service signaling transport session and a component file transport session corresponding to the extended USD.

FIG. 26 illustrates configurations of a service signaling transport session and a component file transport session corresponding to the extended USD.

In the example of FIG. 26, "bcSeg.1-1.1" is described in the broadcastAppService/basePattern in which the matching pattern of the broadcast distribution url is described under the userServiceDescription/deliveryMethod of the USD, and "roiId1" is described as the ROI identifier. Meanwhile, "bbSeg.1-1.1" is described in the unicastAppService/basePattern in which the matching pattern of the net distribution url is described, and "roiId1" is described as the ROI identifier. This means that the same ROI identifier is allocated to a certain segment in both the broadcast distribution and the net distribution. Then, the segment groups being the same can be indicated by grouping by the deliveryMethod/appService/identicalContent.

Here, in the matching pattern described in the basePattern, a part of the baseURL or the SegmentURL described in the MPD (for example, "http://a.com/bc" or the like) is usually described. However, in a case of describing the matching pattern for each segment, the entire SegmentURL (up to a part where the SegmentURL can be uniquely resolved) is described. Therefore, in a case where the ROI of each segment changes, URL granularity for each segment becomes equal to update granularity of USD.

In a case of acquiring a segment without tracking a ROI sequence in the client device 100, when the DASH client unit 140 notifies the proxy server unit 130 of a HTTP request of SegmentURL="bbSeg.1-1.1" (net distribution url), this notification is passed to the broadcast reception unit 110, and the broadcast reception unit 110 searches the USD for bbSeg.1-1.1 and finds that corresponding broadcast distribution url "bcSeg.1-1.1" is a url on the component file session, the broadcast reception unit 110 acquires the segment file from the broadcast stream and supplies the segment file to the DASH client unit 140.

On the other hand, in a case of acquiring a segment by tracking a ROI sequence, it is necessary to notify the DASH client unit 140 of information indicating which ROI sequence the segment obtained by analyzing the USD by the broadcast reception unit 110 belongs to. For this notification, the SAND message of DASH described with reference to FIG. 8 or the like is used.

Specifically, as described above, the broadcast distribution simultaneous use information and the ROI identifier are made able to be stored in the ResourceStatus/Reason elements of the ResourceStatus message of the SAND. However, in the current definition, an arbitrary character string is supposed to be able to be described as tip information in the reason element. However, there are no detailed definitions of what kind of information should be described (there are no definitions about a data structure and semantics).

Therefore, as the data structure, proposed is to make a set of SchemeldUri (required) and value (optional) able to be stored so that arbitrary reception state metadata can be stored. A URI for identifying contents of data indicating the reception state is specified in the SchemeldUri, and contents of a value defined in the URI is made able to be written in the value.

For example, a URN "urn:atsc:BroadcastDelivery" indicating the broadcast distribution simultaneous use is defined as the SchemeldUri, and moreover, "urn:atsc:roiValue" is defined as a scheme for storing the ROI identifier and the ROI identifier is stored in a value attribute.

Figure 27:
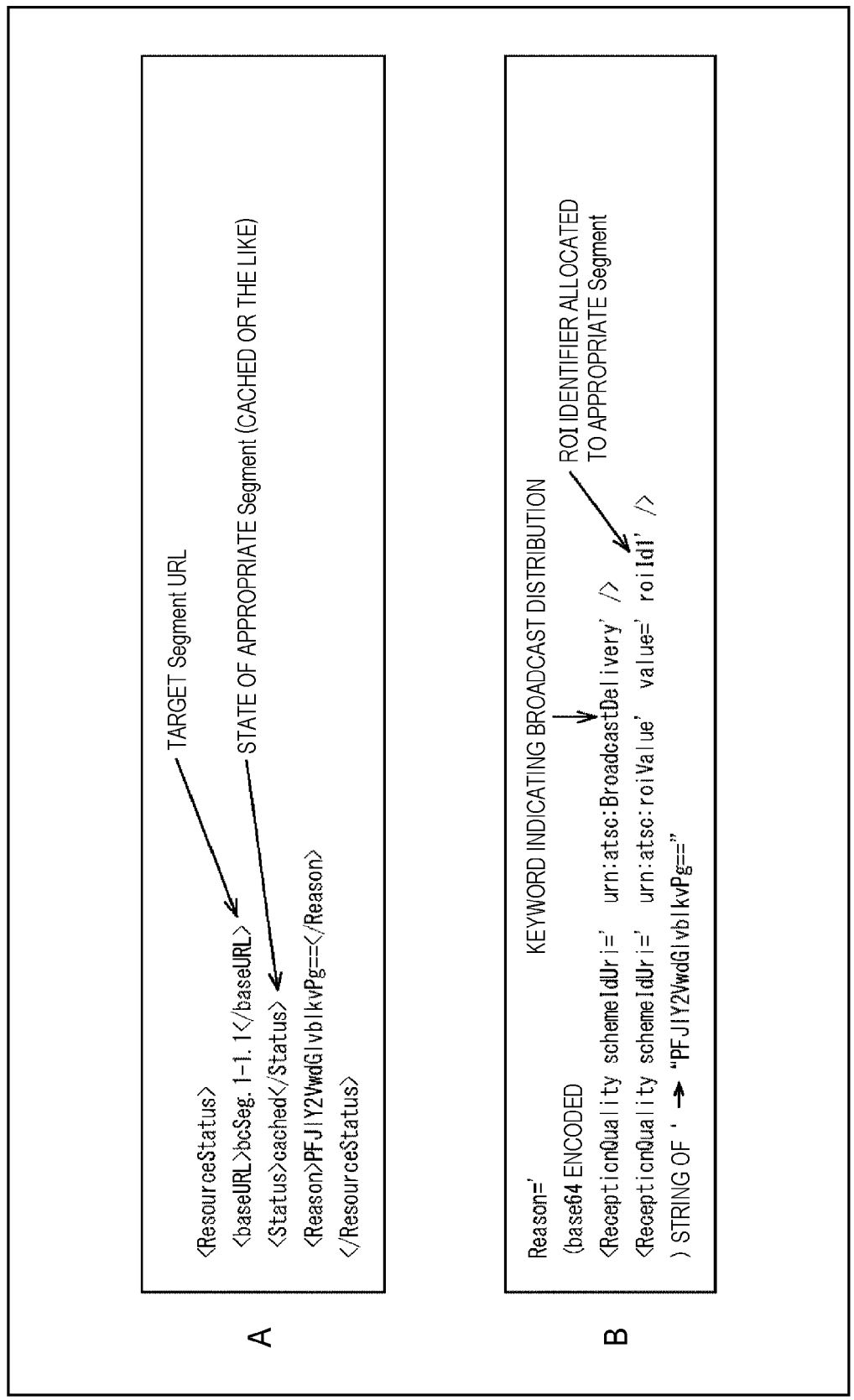
FIG. 27 is a diagram illustrating a specific example of a ResourceStatus message storing the distribution mode information and the ROI identifier.

FIG. 27 illustrates a specific example of a ResourceStatus message storing the broadcast distribution simultaneous use information and the ROI identifier. As illustrated in FIG. 27A, the baseURL element, the status element, and the reason element are described in the ResourceStatus message. Note that, as illustrated in FIG. 27B, the distribution mode information and the ROI identifier are described as a character string in a base64 encoded state in the Reason element.

Figure 28:
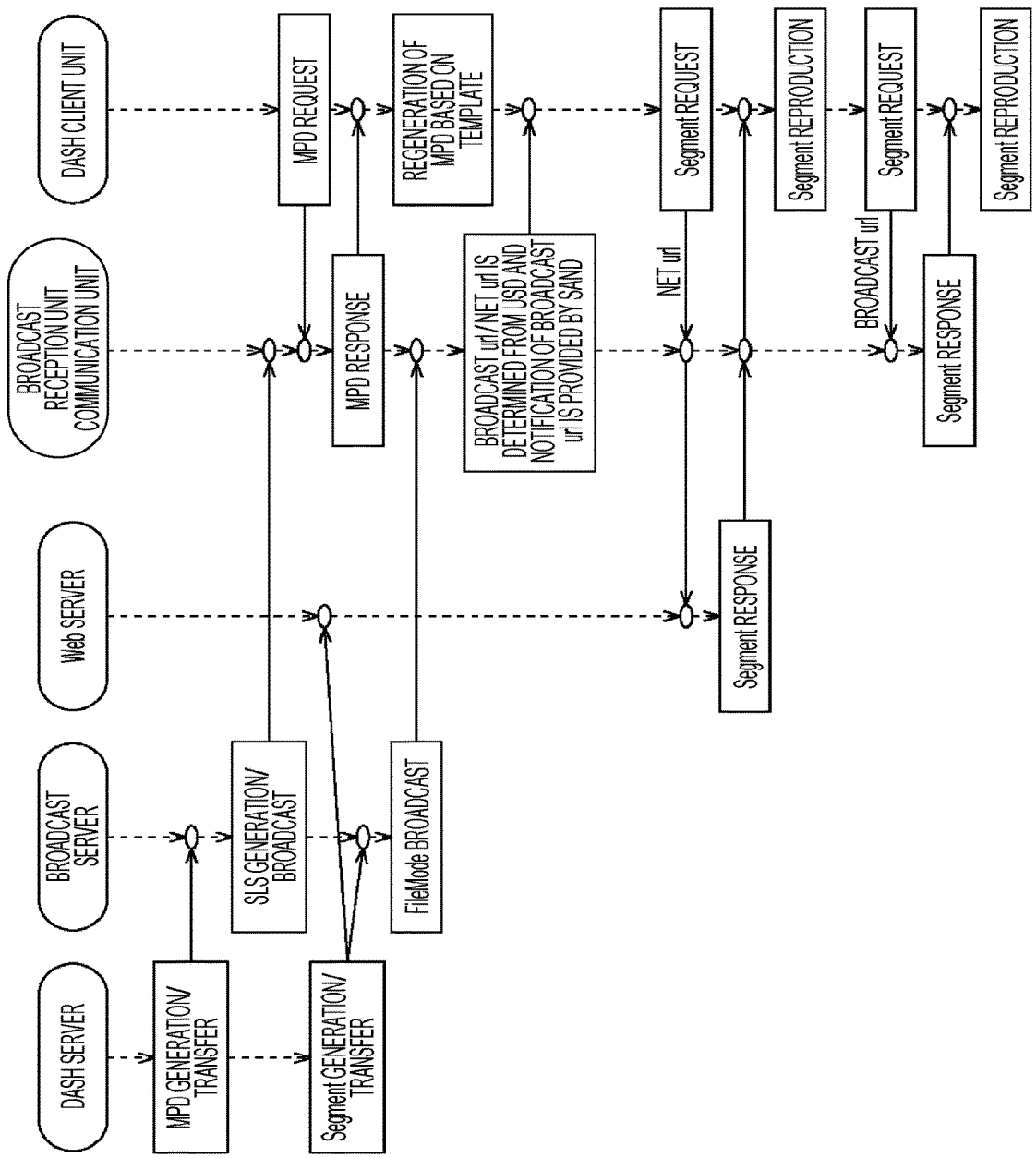
FIG. 28 is a diagram illustrating an operation sequence in a case where the distribution mode information and the ROI identifier are stored in the USD.

Next, FIG. 28 illustrates an operation sequence in a case where the distribution mode information and the ROI identifier are stored in the USD.

On the distribution side, the DASH server generates MPD using SegmentTemplate and transfers the MPD to the broadcast server. Furthermore, the DASH server generates segment files of a content stream and transfers the segment files to the web server, and also transfers a segment file for broadcast distribution simultaneous use, of the segment files, to the broadcast server.

The broadcast server to which the MPD has been transferred generates an SLS file including the USD storing the distribution mode information and the ROI identifier, and distributes the generated SLS file and the transferred MPD by the broadcast distribution via the broadcast network. Furthermore, the broadcast server distributes the segment files of the content stream transferred from the DASH server by the broadcast distribution in FileMode of ROUTE.

In the client device 100 on the reception side, the broadcast reception unit 110 receives the MPD and the SLS file distributed by the broadcast distribution. Thereafter, when the DASH client unit 140 requests the broadcast reception unit 110 to supply the MPD, the broadcast reception unit 110 supplies the MPD to the DASH client unit 140 in response to the request. Note that, in a case where the broadcast reception unit 110 does not receive the MPD distributed by the broadcast distribution, the communication unit 120 can issue an HTTP request to the DASH server and acquire the MPD distributed by net distribution.

The DASH client unit 140 to which the MPD has been supplied regenerates the MPD by restoring complete Segment URL on the basis of the SegmentTemplate.

Moreover, the broadcast reception unit 110 analyzes the USD, determines the distribution mode information and the ROI identifier of each segment, and notifies the proxy server unit 130 of a determination result. The proxy server unit 130 generates the ResourceStatus message that stores the distribution mode information and the ROI identifier of the segment, and notifies the DASH client unit 140 of the ResourceStatus message.

The DASH client unit 140 can select the requested segment on the basis of the ROI identifier or the like described in the MPD and the ResourceStatus message. In a case where the DASH client unit 140 requests the segment to be distributed by the net distribution, the communication unit 120 issues the HTTP request for requesting the segment to the web server, receives the segment supplied (net distribution) from the web server, and supplies the segment to the DASH client unit 140. The DASH client unit 140 reproduces the supplied segment.

Furthermore, in a case where the DASH client unit 140 requests a segment to be distributed by the broadcast distribution, the broadcast reception unit 11 receives the segment distributed by the broadcast distribution and supplies the segment to the DASH client unit 140. The DASH client unit 140 reproduces the supplied segment.

The description of the operation sequence in the case of storing the distribution mode information and the ROI identifier in the USD is terminated.

By the way, in a case of signaling the distribution mode information and ROI identifier of each segment using the USD as described above, when whether or not the segment is for the broadcast distribution simultaneous use is changed according to the segment granularity (in units of segments), the UDS needs to be updated at every change. However, the USD is originally introduced to signal an attribute that is not changed across the entire service (channel) and operation that requires frequent update is not assumed (but such operation is not prohibited). Therefore, the following methods (1) and (2) are proposed for two kinds of methods of performing similar signaling without using USD.

(1) In a case where a transfer mode of ROUTE is FileMode, EFDT is extended to store the ROI identifier.

(2) In a case where the transfer mode of ROUTE is EntityMode not using the EFDT, the entity header is extended to store a url for identifying the same content and the ROI identifier.

<Extension of EFDT>

The distribution mode information and ROI identifier of each segment can be signaled using the EFDT of the S-TSID (a part (fragment) of a signaling fragment that can be transferred together with the file group described on each component file session).

Figure 29:
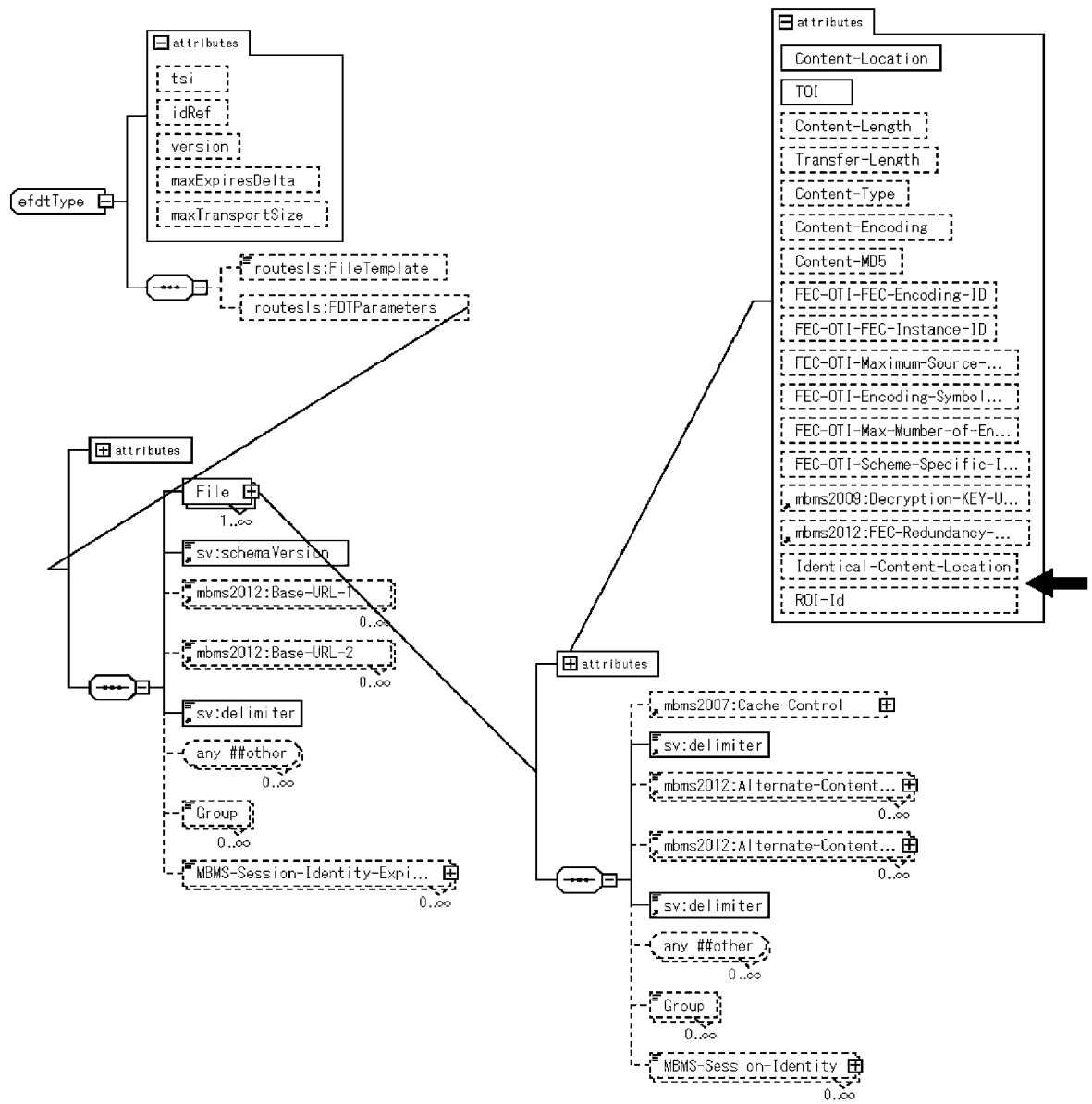
FIG. 29 is a diagram illustrating an extended position of EFDT.

FIG. 29 illustrates the EFDT at a specific extended position in order to store the ROI identifier. As illustrated in FIG. 29, RoiId and Identical-Content-Location are added in parallel in efdtType/routesls:FDTParameters/File/atributes/Content-Location attributes.

Figure 30:
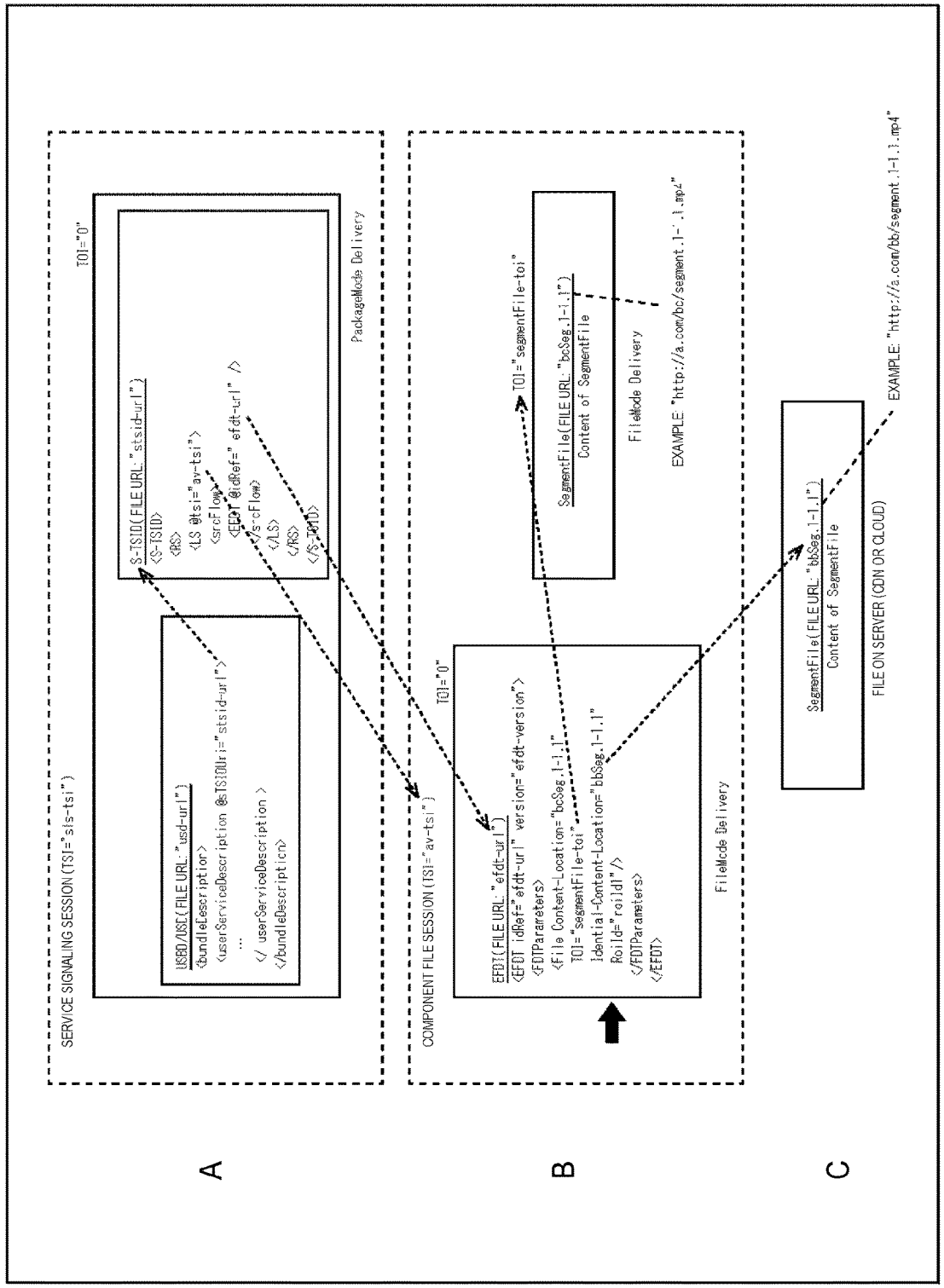
FIG. 30 is a diagram illustrating configurations of a service signaling transport session and a component file transport session corresponding to the extended EFDT.

FIG. 30 illustrates configurations of a service signaling transport session and a component file transport session corresponding to the extended EFDT.

As illustrated in FIG. 30, the net distribution url (bbSeg.1-1.1 in the case of FIG. 30) is described in Identical-Content-Location added to a Content-Location attribute for describing the file URL of the segment file, and a ROI descriptor ("roiId1" in the case of FIG. 30) is described in RoiId, in the EFDT in the component file session referenced from S-TSID/RS/LS/srcFlow/EFDT of an S-TSID fragment referenced from bundleDescriptionROUTE/userServiceDescription@sTSIDUri of the USD associated with the MPD that is the source for generating the segment.

In this case, similarly to the case of using the extended USD, in acquiring a segment without tracking a ROI sequence in the client device 100, when the DASH client unit 140 notifies the proxy server unit 130 of a HTTP request of SegmentURL="bbSeg.1-1.1" (net distribution url), this notification is passed to the broadcast reception unit 110, and the broadcast reception unit 110 searches the EFDT for bbSeg.1-1.1 and finds that corresponding broadcast distribution url "bcSeg.1-1.1" is a url on the component file session, the broadcast reception unit 110 acquires the segment file from the broadcast stream and supplies the segment file to the DASH client unit 140.

On the other hand, in acquiring a segment by tracking a ROI sequence, it is necessary to notify the DASH client unit 140 of information indicating which ROI sequence the segment obtained by analyzing the EFDT by the broadcast reception unit 110 belongs to. For this notification, the above-described SAND message of DASH or the like is used.

Figure 31:
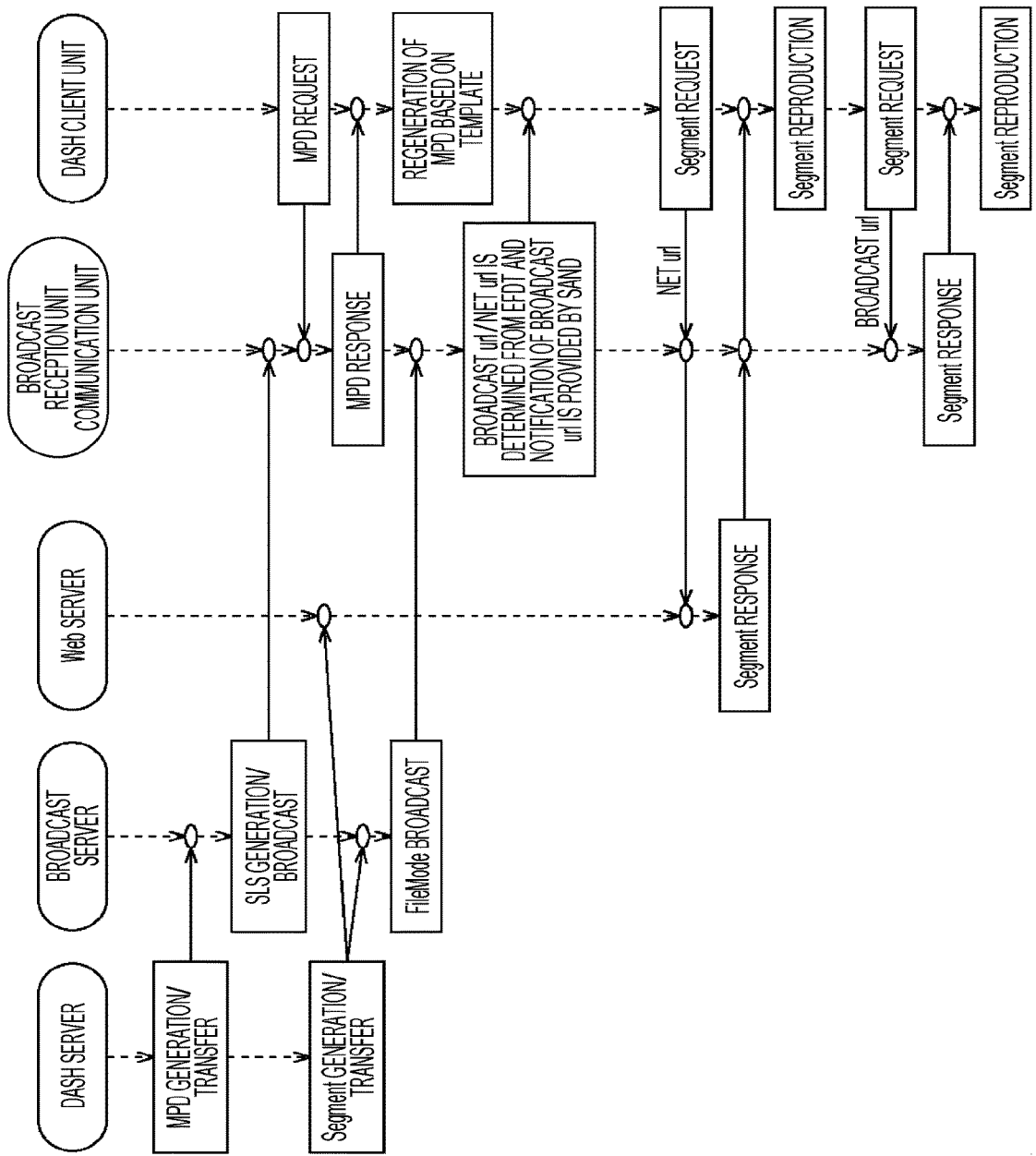
FIG. 31 is a diagram illustrating an operation sequence in a case where the distribution mode information and the ROI identifier are stored in the EFDT.

Next, FIG. 31 illustrates an operation sequence in a case where distribution mode information and the ROI identifier are stored in the EFDT.

On the distribution side, the DASH server generates MPD using SegmentTemplate and transfers the MPD to the broadcast server. Furthermore, the DASH server generates segment files of a content stream and transfers the segment files to the web server, and also transfers a segment file for broadcast distribution simultaneous use, of the segment files, to the broadcast server.

The broadcast server to which the MPD has been transferred generates an SLS file including the EFDT storing the distribution mode information and the ROI identifier, and distributes the generated SLS file and the transferred MPD by the broadcast distribution via the broadcast network. Furthermore, the broadcast server distributes the segment files of the content stream transferred from the DASH server by the broadcast distribution in FileMode of ROUTE.

In the client device 100 on the reception side, the broadcast reception unit 110 receives the MPD and the SLS file distributed by the broadcast distribution. When the DASH client unit 140 requests the broadcast reception unit 110 to supply the MPD, the broadcast reception unit 110 supplies the MPD to the DASH client unit 140 in response to the request. Note that, in a case where the broadcast reception unit 110 does not receive the MPD distributed by the broadcast distribution, the communication unit 120 can issue an HTTP request to the DASH server and acquire the MPD distributed by net distribution.

The DASH client unit 140 to which the MPD has been supplied regenerates the MPD by restoring complete Segment URL on the basis of the SegmentTemplate.

Moreover, the broadcast reception unit 110 analyzes the EFDT, determines the distribution mode information and the ROI identifier of each segment, and notifies the proxy server unit 130 of a determination result. The proxy server unit 130 generates the ResourceStatus message that stores the distribution mode information and the ROI identifier of the segment, and notifies the DASH client unit 140 of the ResourceStatus message.

The DASH client unit 140 can select the requested segment on the basis of the ROI identifier or the like described in the MPD and the ResourceStatus message. In a case where the DASH client unit 140 requests the segment to be distributed by the net distribution, the communication unit 120 issues the HTTP request for requesting the segment to the web server, receives the segment supplied (net distribution) from the web server, and supplies the segment to the DASH client unit 140. The DASH client unit 140 reproduces the supplied segment.

Furthermore, in a case where the DASH client unit 140 requests a segment to be distributed by the broadcast distribution, the broadcast reception unit 11 receives the segment distributed by the broadcast distribution and supplies the segment to the DASH client unit 140. The DASH client unit 140 reproduces the supplied segment.

The description of the operation sequence in the case of storing the distribution mode information and the ROI identifier in the EFDT is terminated.

<Extension of Entity Header>

The file of the distribution mode information and the ROI identifier of each segment is transferred in the EntityMode during the component file session, and the entity header is extended, whereby the distribution mode information and the ROI identifier can be signaled.

Figure 32:
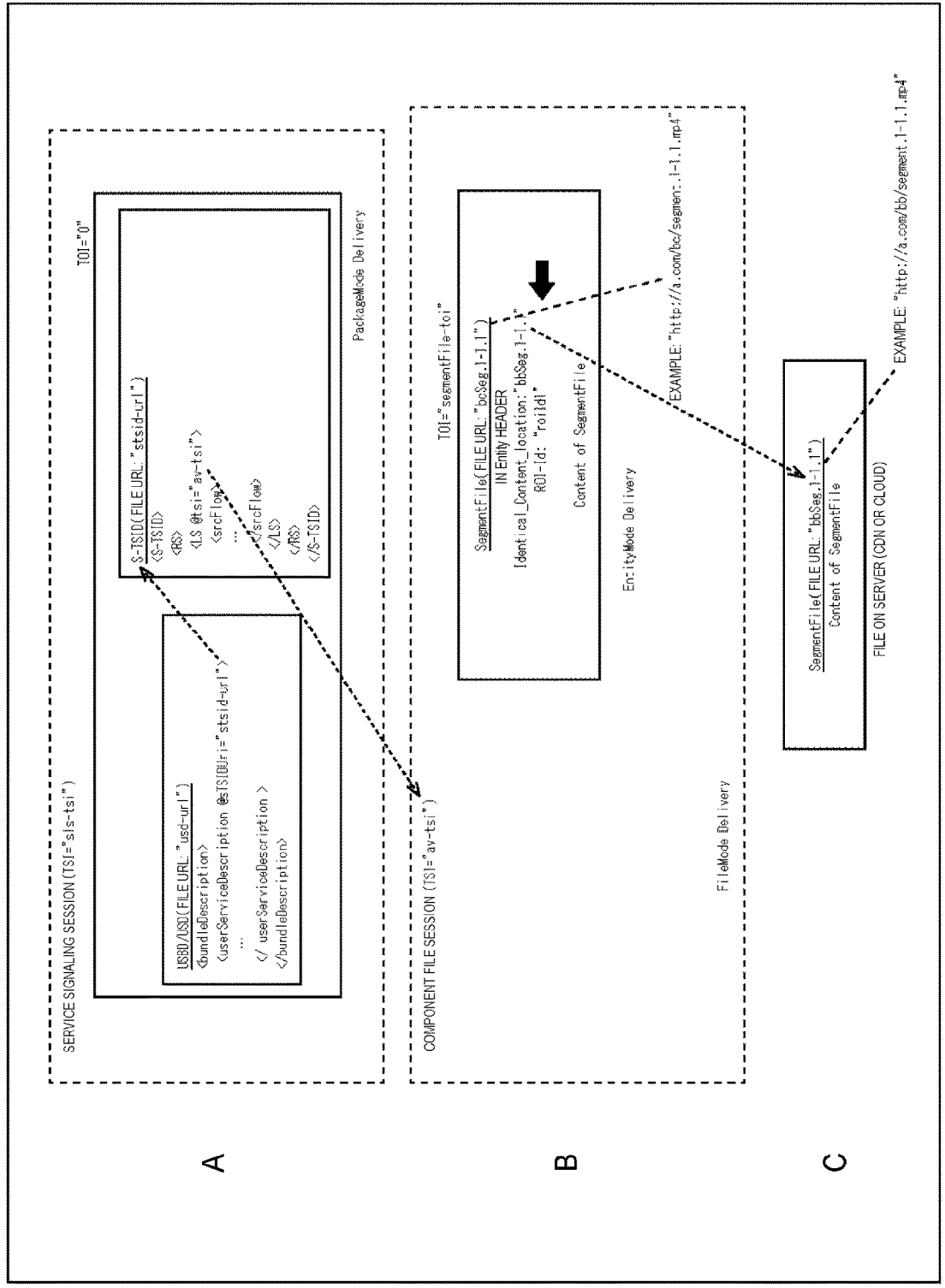
FIG. 32 is a diagram illustrating configurations of a service signaling transport session and a component file transport session corresponding to an extended entity header.
Figure 33:
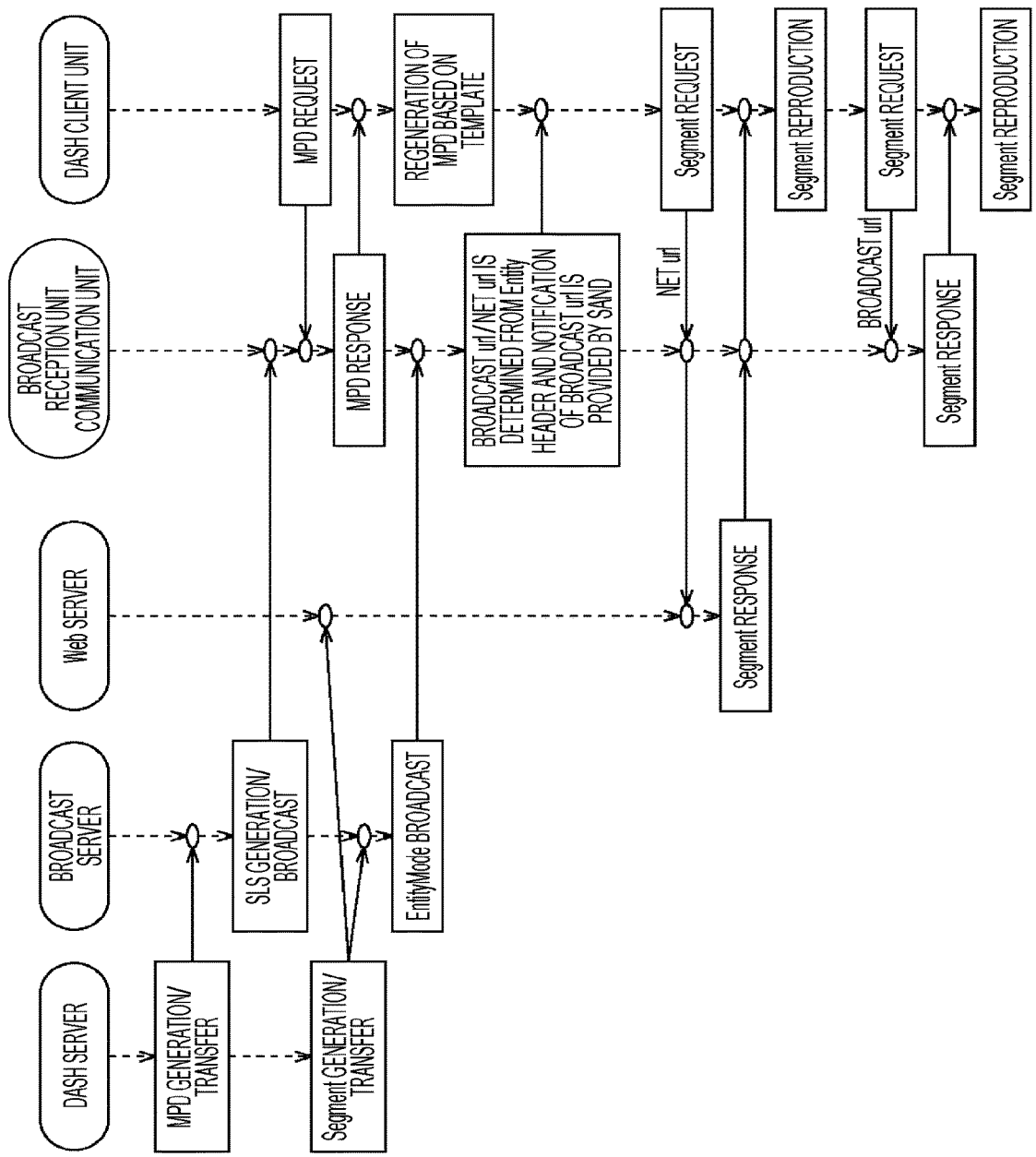
FIG. 33 is a diagram illustrating an operation sequence in a case where the distribution mode information and the ROI identifier are stored in the entity header.

FIG. 32 illustrates configurations of a service signaling transport session and a component file transport session corresponding to the extended entity header.

As illustrated in FIG. 32, an Identical-Content-Location element and a ROI-id element are provided in the entity header of the segment file flowing in the component file session referenced from S-TSID/RS/LS@tsi of the S-TSID fragment referenced from bundleDescriptionROUTE/userServiceDescription@sTSIDUri of the USD associated with the MPD that is the source for generating the segment, and the net distribution url (bbSeg.1-1.1 in the case of FIG. 32) is described in the Identical-Content-Location, and a ROI identifier (roiId1 in the case of FIG. 32) is described in the ROI-id.

In this case, similarly to the case of using the extended USD or the extended EFDT, in acquiring a segment without tracking a ROI sequence in the client device 100, when the DASH client unit 140 notifies the proxy server unit 130 of a HTTP request of SegmentURL="bbSeg.1-1.1" (net distribution url), this notification is passed to the broadcast reception unit 110, and the broadcast reception unit 110 finds that "bbSeg.1-1.1" as a broadcast distribution url corresponding to bbSeg.1-1.1 from the entity header of a file group of EntityMode distribution acquired from the broadcast stream is a url on the component file session on the basis of bbSeg.1-1.1, the broadcast reception unit 110 acquires the segment file from the broadcast stream and supplies the segment file to the DASH client unit 140.

On the other hand, in acquiring a segment by tracking a ROI sequence, it is necessary to notify the DASH client unit 140 of information indicating which ROI sequence the segment obtained by analyzing the entity header by the broadcast reception unit 110 belongs to. For this notification, the above-described SAND message of DASH or the like is used.

Next, FIG. 32 illustrates an operation sequence in a case where the distribution mode information and the ROI identifier are stored in the entity header.

On the distribution side, the DASH server generates MPD using SegmentTemplate and transfers the MPD to the broadcast server. Furthermore, the DASH server generates the entity header storing the distribution mode information and the ROI identifier, and generates the segment files of the content stream and transfers the segment file to the web server, and also transfers the segment file for the broadcast distribution simultaneous use, of the segment files, to the broadcast server.

The broadcast server to which the MPD has been transferred generates an SLS file and distributes the generated SLS file and the transferred MPD by the broadcast distribution via the broadcast network. Furthermore, the broadcast server distributes the segment files of the content stream transferred from the DASH server by the broadcast distribution in EntityMode of ROUTE.

In the client device 100 on the reception side, the broadcast reception unit 110 receives the MPD and the SLS file distributed by the broadcast distribution. When the DASH client unit 140 requests the broadcast reception unit 110 to supply the MPD, the broadcast reception unit 110 supplies the MPD to the DASH client unit 140 in response to the request. Note that, in a case where the broadcast reception unit 110 does not receive the MPD distributed by the broadcast distribution, the communication unit 120 can issue an HTTP request to the DASH server and acquire the MPD distributed by net distribution.

The DASH client unit 140 to which the MPD has been supplied regenerates the MPD by restoring complete Segment URL on the basis of the SegmentTemplate.

Moreover, the broadcast reception unit 110 analyzes the entity header, determines the distribution mode information and the ROI identifier of each segment, and notifies the proxy server unit 130 of a determination result. The proxy server unit 130 generates the ResourceStatus message that stores the distribution mode information and the ROI identifier of the segment, and notifies the DASH client unit 140 of the ResourceStatus message.

The DASH client unit 140 can select the requested segment on the basis of the ROI identifier or the like described in the MPD and the ResourceStatus message. In a case where the DASH client unit 140 requests the segment to be distributed by the net distribution, the communication unit 120 issues the HTTP request for requesting the segment to the web server, receives the segment supplied (net distribution) from the web server, and supplies the segment to the DASH client unit 140. The DASH client unit 140 reproduces the supplied segment.

Furthermore, in a case where the DASH client unit 140 requests a segment to be distributed by the broadcast distribution, the broadcast reception unit 11 receives the segment distributed by the broadcast distribution and supplies the segment to the DASH client unit 140. The DASH client unit 140 reproduces the supplied segment.

The description of the operation sequence in the case of storing the distribution mode information and the ROI identifier in the entity header is terminated.

<Examples of Use of ROI Identifier in Client Device 100>

Figure 34:
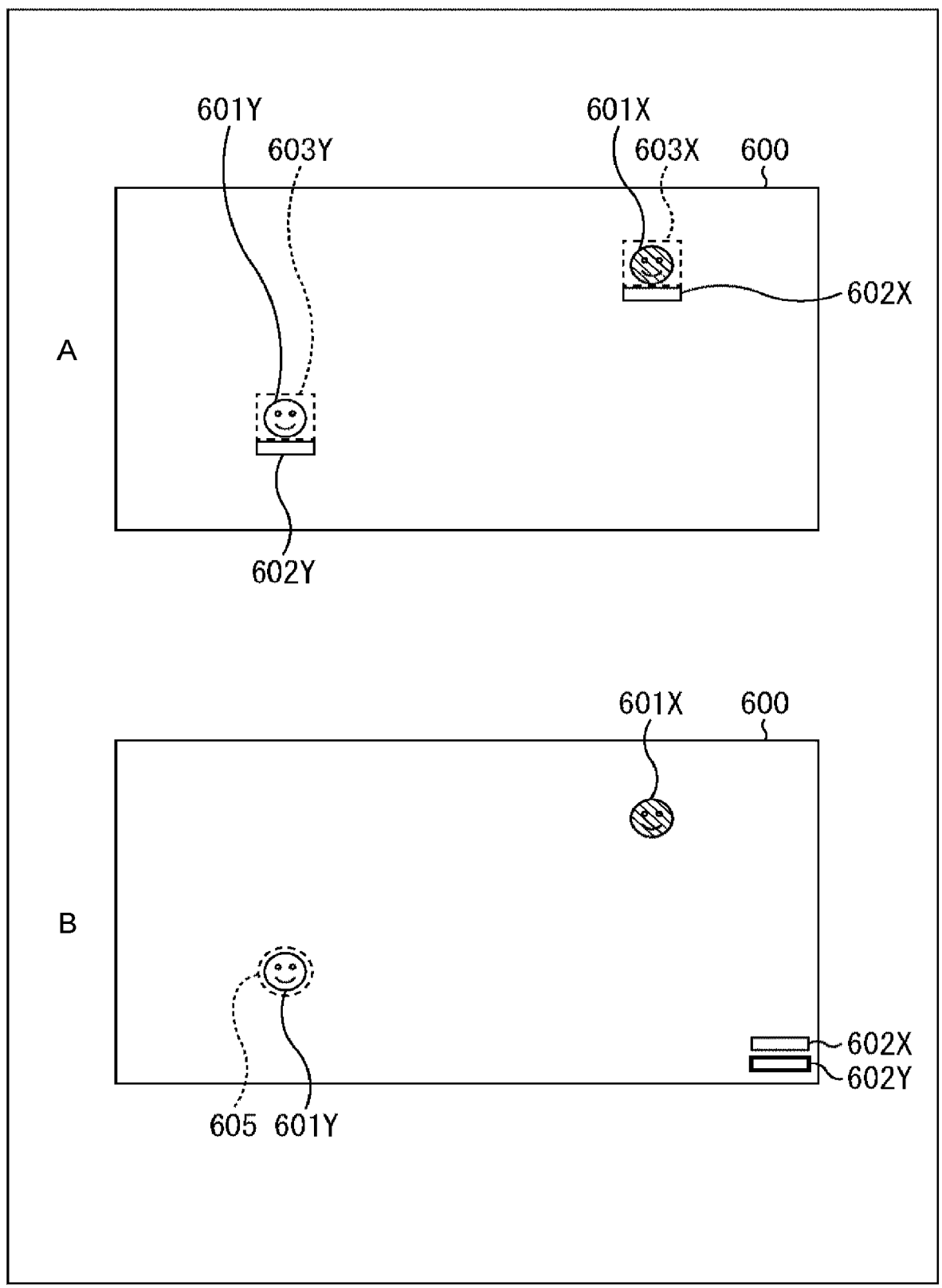
FIG. 34 is a diagram illustrating examples of use of the ROI identifier in the client device.

As described above, in a case where metadata corresponding to each ROI sequence is supplied, the client device 100 can use the metadata for U/I. FIG. 34 illustrates examples of use of the ROI identifier and the metadata corresponding to each ROI sequence.

FIG. 34A illustrates an example of use in which when persons 601 to which ROIs are set are displayed on a screen 600, display areas 602 of respective metadata (persons' names and the like) are moved together with the persons 601 and displayed. In this example of use, for example, in a case where an area 603X including a person 601X is designated by the user, the video of the screen 600 can be enlarged with the person 601X as the center or switched to the video of the ROI set to the person 601X.

FIG. 34B illustrates an example of use in which when persons 601 to which ROIs are set are displayed on a screen 600, display areas 602 of the metadata (persons' names and the like) are collectively displayed at an end of the screen 600. In this example of use, for example, in a case where a display area 602Y of the metadata corresponding to a person 601Y is selected by the user, the person 601Y on the screen 600 can be emphasized (in the display example of FIG. 34B, a frame 605 displayed in a blinking manner is displayed around the person 601Y), enlarged with the person 601Y as the center, or switched to the video of the ROI set to the person 601Y.

Other Embodiments

By the way, the above-described series of processing can be executed by hardware or software. In the case of executing the series of processing by software, a program that configures the software is installed in a computer. Here, examples of the computer include a computer incorporated in dedicated hardware, and a general-purpose personal computer or the like capable of executing various functions by installing various programs, for example.

Figure 35:
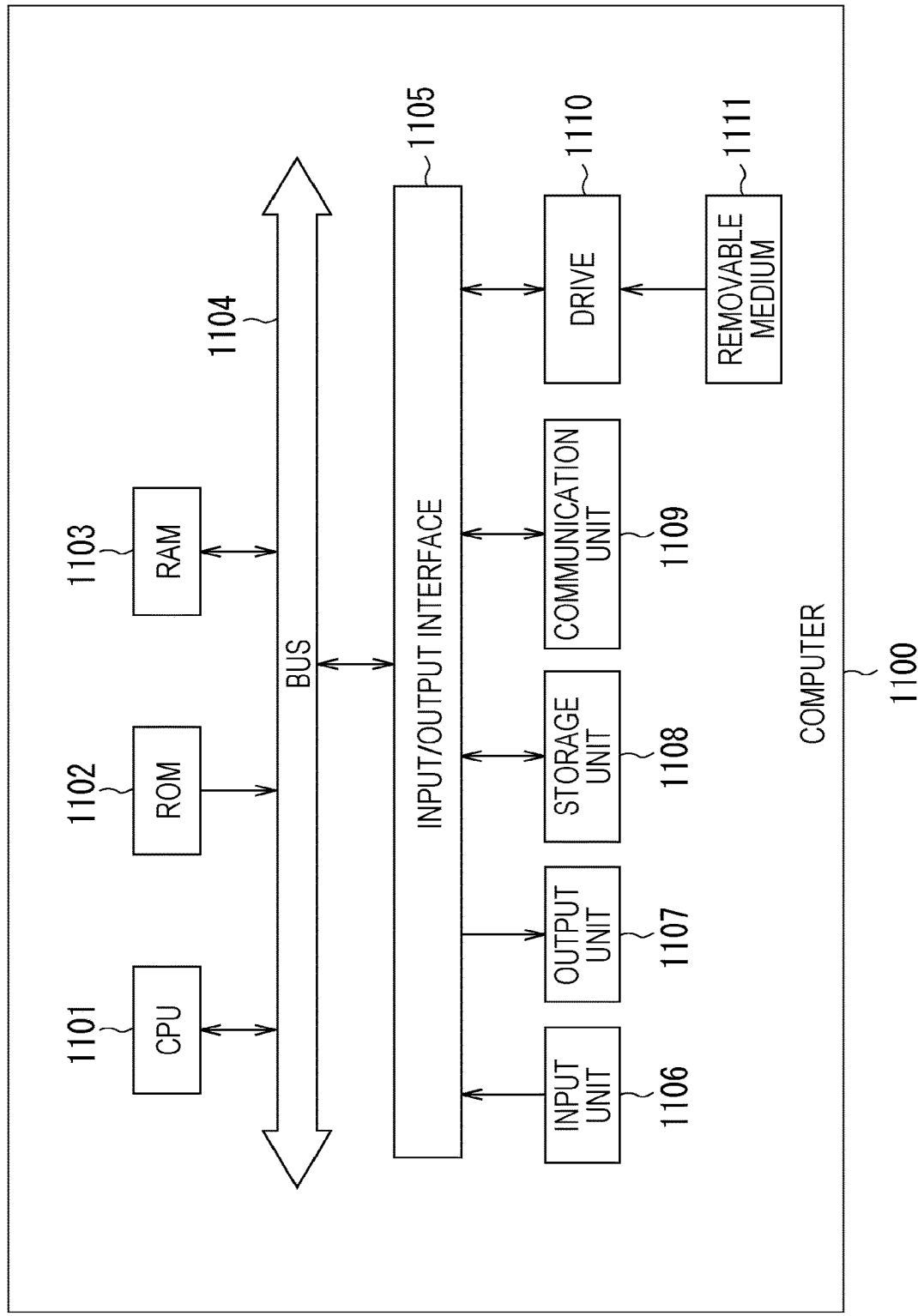
FIG. 35 is a block diagram illustrating a configuration example of a general-purpose computer.

FIG. 35 is a block diagram illustrating a configuration example of hardware of a computer that executes the above-described series of processing by a program.

In a computer 1100, a central processing unit (CPU) 1101, a read only memory (ROM) 112, and a random access memory (RAM) 1103 are mutually connected by a bus 1104.

Moreover, an input/output interface 1105 is connected to the bus 1104. An input unit 1106, an output unit 1107, a storage unit 1108, a communication unit 1109, and a drive 1110 are connected to the input/output interface 1105.

The input unit 1106 includes a keyboard, a mouse, a microphone, and the like. The output unit 1107 includes a display, a speaker, and the like. The storage unit 1108 includes a hard disk, a nonvolatile memory, and the like. The communication unit 1109 includes a network interface and the like. The drive 1110 drives a removable medium 1111 such as a magnetic disk, an optical disk, a magneto-optical disk, or a semiconductor memory.

In the computer 1100 configured as described above, the CPU 1101 loads, for example, a program stored in the storage unit 1108 into the RAM 1103 and executes the program via the input/output interface 1105 and the bus 1104, whereby the above-described series of processing is performed.

The program to be executed by the computer 1100 (CPU 1101) can be recorded on the removable medium 1111 as a package medium and the like, for example, and provided. Furthermore, the program can be provided via a wired or wireless transmission medium such as a local area network, the Internet, or digital satellite broadcast.

In the computer 1100, the removable medium 1111 is attached to the drive 1110, whereby the program can be installed in the storage unit 1108 via the input/output interface 1105. Furthermore, the program can be received by the communication unit 1109 via a wired or wireless transmission medium and installed in the storage unit 1108. Other than the above method, the program can be installed in the ROM 1102 or the storage unit 1108 in advance.

Note that the program executed by the computer 1100 may be a program processed in chronological order according to the order described in the present specification or may be a program executed in parallel or at necessary timing such as when a call is made.

Note that embodiments of the present technology are not limited to the above-described embodiments, and various modifications can be made without departing from the gist of the present technology.

The present technology can also have the following configurations.

(1)

A distribution device including:

a segment filing unit configured to make a video stream of each of areas obtained by imaging an imaging range divided into a plurality of the areas into a segment file;

a distribution unit configured to supply the segment file of the video stream of each of the areas to a reception side by at least one of net distribution or broadcast distribution; and a notification unit configured to notify, in a case where an ROI including one or more of the areas is set to the imaging range, the reception side of an ROI identifier for identifying the belonging ROI as attribute information related to the segment file corresponding to the area included in the ROI.

(2)

The distribution device according to (1), in which the notification unit further notifies the reception side of distribution mode information indicating by which of the net distribution and the broadcast distribution the segment file is distributed as the attribute information related to the segment file.

(3)

The distribution device according to (1) or (2), in which the notification unit describes the attribute information related to the segment file in MPD defined in DASH and notifies the reception side of the attribute information.

(4)

The distribution device according to (1) or (2), in which, in a case where SegmentTemplate is used in MPD defined in DASH, the notification unit describes the attribute information related to the segment file in USD and notifies the reception side of the attribute information.

(5)

The distribution device according to (1) or (2), in which, in a case where SegmentTemplate is used in MPD defined in DASH, the notification unit describes the attribute information related to the segment file in EFDT and notifies the reception side of the attribute information.

(6)

The distribution device according to (1) or (2), in which, in a case where SegmentTemplate is used in MPD defined in DASH, the notification unit describes the attribute information related to the segment file in an entity header and notifies the reception side of the attribute information.

(7)

The distribution device according to any one of (1) to (6), in which one or more of the ROIs are set to the imaging range.

(8)

The distribution device according to any one of (1) to (7), in which the distribution unit distributes all of segment files of the video stream respectively corresponding to the areas by the net distribution, and distributes the segment file corresponding to the area included in the ROI by the broadcast distribution.

(9)

A distribution method by a distribution device, the distribution method including:

by the distribution device, a segment filing unit configured to make a video stream of each of areas obtained by imaging an imaging range divided into a plurality of the areas into a segment file;

a distribution step of supplying the segment file of the video stream of each of the areas to a reception side by at least one of net distribution or broadcast distribution; and a notification step of notifying, in a case where an ROI including one or more of the areas is set to the imaging range, the reception side of an ROI identifier for identifying the belonging ROI as attribute information related to the segment file corresponding to the area included in the ROI.

(10)

A program for causing a computer to function as:

a segment filing unit configured to make a video stream of each of areas obtained by imaging an imaging range divided into a plurality of the areas into a segment file;

a distribution unit configured to supply the segment file of the video stream of each of the areas to a reception side by at least one of net distribution or broadcast distribution; and a notification unit configured to notify, in a case where an ROI including one or more of the areas is set to the imaging range, the reception side of an ROI identifier for identifying the belonging ROI as attribute information related to the segment file corresponding to the area included in the ROI.

(11)

A reception device including:

an analysis unit configured to acquire and analyze, in a case where a ROI including one or more areas is set to an imaging range divided into a plurality of areas, attribute information related to a segment file of a video stream corresponding to the area included in the ROI and the attribute information including a ROI identifier for identifying the at least belonging ROI;

a request unit configured to request the segment file corresponding to a predetermined ROI identifier on the basis of an analysis result of the attribute information;

an acquisition unit configured to acquire the requested segment file corresponding to the predetermined ROI identifier by net distribution or broadcast distribution; and a reproduction unit configured to reproduce the acquired segment file.

(12)

The reception device according to (11), in which the request unit requests the segment file corresponding to an ROI identifier specified by an operation from a user.

(13)

The reception device according to (12), in which the request unit requests the segment file corresponding to an ROI identifier specified by an operation to designate an object on a screen.

(14)

The reception device according to (12), in which the request unit requests the segment file corresponding to an ROI identifier specified by an operation to select metadata of an object.

(15)

The reception device according to any one of (11) to (14), in which the attribute information further includes distribution mode information indicating by which of the net distribution and the broadcast distribution the segment file is distributed, and the acquisition unit acquires the requested segment file corresponding to the predetermined ROI identifier by net distribution or broadcast distribution on the basis of the distribution mode information.

(16)

The reception device according to any one of (11) to (15), in which the request unit is notified of the analysis result of the attribute information by the analysis unit using a SAND message.

(17)

A reception method by a reception device, the reception method including:

by the reception device, an analysis step of acquiring and analyzing, in a case where a ROI including one or more areas is set to an imaging range divided into a plurality of areas, attribute information related to a segment file of a video stream corresponding to the area included in the ROI and the attribute information including a ROI identifier for identifying the at least belonging ROI;

a request step of requesting the segment file corresponding to a predetermined ROI identifier on the basis of an analysis result of the attribute information;

an acquisition step of acquiring the requested segment file corresponding to the predetermined ROI identifier by net distribution or broadcast distribution; and a reproduction step of reproducing the acquired segment file.

(18)

A program for causing a computer to function as:

an analysis unit configured to acquire and analyze, in a case where a ROI including one or more areas is set to an imaging range divided into a plurality of areas, attribute information related to a segment file of a video stream corresponding to the area included in the ROI and the attribute information including a ROI identifier for identifying the at least belonging ROI;

a request unit configured to request the segment file corresponding to a predetermined ROI identifier on the basis of an analysis result of the attribute information;

an acquisition unit configured to acquire the requested segment file corresponding to the predetermined ROI identifier by net distribution or broadcast distribution; and a reproduction unit configured to reproduce the acquired segment file.

(19)

A content distribution system including a distribution device and a reception device, the distribution device including:

a segment filing unit configured to make a video stream of each of areas obtained by imaging an imaging range divided into a plurality of the areas into a segment file;

a distribution unit configured to supply the segment file of the video stream of each of the areas to a reception side by at least one of net distribution or broadcast distribution; and a notification unit configured to notify, in a case where an ROI including one or more of the areas is set to the imaging range, the reception side of an ROI identifier for identifying the belonging ROI as attribute information related to the segment file corresponding to the area included in the ROI, and the reception device including:

an analysis unit configured to analyze the attribute information given in notification from the distribution device;

a request unit configured to request the segment file corresponding to a predetermined ROI identifier on the basis of an analysis result of the attribute information;

an acquisition unit configured to acquire the requested segment file corresponding to the predetermined ROI identifier by net distribution or broadcast distribution; and a reproduction unit configured to reproduce the acquired segment file.

REFERENCE SIGNS LIST

10 Broadcaster
11 Broadcast network
12 CDN
20 LAN
100 Client device
110 Broadcast reception unit
120 Communication unit
130 Proxy server unit
140 DASH client unit
300 DANE
400 DASH client
514 ROI
1100 Computer
1101 CPU

The invention claimed is:

1. A reception device comprising:
circuitry configured to:
acquire and analyze, in a case where a region of interest (ROI) including one or more areas is set to an imaging range divided into a plurality of areas, attribute information related to a segment file of a video stream corresponding to the area included in the ROI and the attribute information including an ROI identifier for identifying at least a belonging ROI allocated to an appropriate segment, the ROI identifier being defined only by a single string of characters;

request the segment file corresponding to a predetermined ROI identifier based on an analysis result of the attribute information;

acquire the requested segment file corresponding to the predetermined ROI identifier by net distribution or broadcast distribution based on a distribution mode information; and reproduce the acquired segment file.

2. The reception device according to claim 1, wherein the circuitry is further configured to request the segment file corresponding to the ROI identifier specified by an operation from a user.

3. The reception device according to claim 2, wherein the attribute information further includes distribution mode information indicating by which of the net distribution and the broadcast distribution the segment file is distributed, and the circuitry is further configured to acquire the requested segment file corresponding to the predetermined ROI identifier by the net distribution or the broadcast distribution based on the distribution mode information.

4. The reception device according to claim 2, wherein the circuitry is notified of the analysis result of the attribute information by using a Server and Network Assisted Dynamic Adaptive Streaming over HTTP (SAND) message.

5. The reception device according to claim 1, wherein the circuitry is further configured to request the segment file corresponding to the ROI identifier specified by an operation to designate an object on a screen.

6. The reception device according to claim 1, wherein the circuitry is further configured to request the segment file corresponding to the ROI identifier specified by an operation to select metadata of an object.

7. A reception method by a reception device, the reception method comprising:

by the reception device, acquiring and analyzing, in a case where a region of interest (ROI) including one or more areas is set to an imaging range divided into a plurality of areas, attribute information related to a segment file of a video stream corresponding to the area included in the ROI and the attribute information including an ROI identifier for identifying at least a belonging ROI allocated to an appropriate segment, the ROI identifier being defined only by a single string of characters;

requesting the segment file corresponding to a predetermined ROI identifier based on an analysis result of the attribute information;

acquiring the requested segment file corresponding to the predetermined ROI identifier by net distribution or broadcast distribution; and reproducing the acquired segment file.

8. A non-transitory computer readable medium storing computer readable instructions thereon that, when executed by a computer, causes the computer to perform a method comprising:

acquiring and analyzing, in a case where an ROI including one or more areas is set to an imaging range divided into a plurality of areas, attribute information related to a segment file of a video stream corresponding to the area included in the ROI and the attribute information including an ROI identifier for identifying at least a belonging ROI allocated to an appropriate segment, the ROI identifier being defined only by a single string of characters;

requesting the segment file corresponding to a predetermined ROI identifier based on an analysis result of the attribute information;

acquiring the requested segment file corresponding to the predetermined ROI identifier by net distribution or broadcast distribution; and reproducing the acquired segment file.

* * * * *